United States Patent
Deng

(10) Patent No.: US 11,087,537 B2
(45) Date of Patent: Aug. 10, 2021

(54) METHOD, DEVICE AND MEDIUM FOR DETERMINING POSTURE OF VIRTUAL OBJECT IN VIRTUAL ENVIRONMENT

(71) Applicant: Tencent Technology (Shenzhen) Company Limited, Shenzhen (CN)

(72) Inventor: Yang Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/882,515

(22) Filed: May 24, 2020

(65) Prior Publication Data
US 2020/0286288 A1 Sep. 10, 2020

Related U.S. Application Data

(63) Continuation of application No. PCT/CN2018/117008, filed on Nov. 22, 2018.

(30) Foreign Application Priority Data

Feb. 9, 2018 (CN) .......................... 201810136822.0

(51) Int. Cl.
*G06T 19/00* (2011.01)
*A63F 13/42* (2014.01)
(Continued)

(52) U.S. Cl.
CPC .............. *G06T 19/00* (2013.01); *A63F 13/42* (2014.09); *A63F 13/52* (2014.09); *A63F 13/577* (2014.09);
(Continued)

(58) Field of Classification Search
CPC ..... G06T 19/00; G06T 2210/21; G06T 15/08; G06T 19/003
See application file for complete search history.

(56) References Cited

U.S. PATENT DOCUMENTS

2003/0022715 A1 1/2003 Okubo
2003/0216175 A1 11/2003 Osako et al.
(Continued)

FOREIGN PATENT DOCUMENTS

CN 1681566 A 10/2005
CN 101578635 A 11/2009
(Continued)

OTHER PUBLICATIONS

Tencent Technology, ISR, PCT/CN2018/117008, Feb. 27, 2019, 2 pgs.
(Continued)

*Primary Examiner* — Said Broome
(74) *Attorney, Agent, or Firm* — Morgan, Lewis & Bockius LLP

(57) ABSTRACT

This application discloses a method for determining a posture of a virtual object in a virtual environment performed at an electronic device. The method includes: determining at least one sampling point of the virtual object; determining a normal direction of the virtual object relative to the ground according to the at least one sampling point and the ground on which the virtual object is located; determining a ground-hugging posture of the virtual object in the virtual environment according to the normal direction; and rendering the virtual object in the virtual environment according to the ground-hugging posture. The normal direction of the ground on which the virtual object is located is determined according to the sampling point, and the ground-hugging posture of the virtual object in the virtual environment is obtained according to the normal direction.

20 Claims, 14 Drawing Sheets

(51) Int. Cl.
  *A63F 13/52* (2014.01)
  *A63F 13/577* (2014.01)
  *A63F 13/837* (2014.01)
  *H04L 29/06* (2006.01)

(52) U.S. Cl.
  CPC ..... *A63F 13/837* (2014.09); *A63F 2300/6045* (2013.01); *A63F 2300/643* (2013.01); *A63F 2300/8076* (2013.01); *G06T 2210/21* (2013.01); *H04L 67/38* (2013.01)

(56) References Cited

U.S. PATENT DOCUMENTS

| 2007/0078918 | A1* | 4/2007 | Nagasaka | G06T 19/00 708/200 |
| 2010/0248826 | A1* | 9/2010 | Kikuchi | A63F 13/44 463/30 |
| 2011/0039625 | A1 | 2/2011 | Sakai et al. | |
| 2014/0247212 | A1 | 9/2014 | Kim et al. | |

FOREIGN PATENT DOCUMENTS

| CN | 101622647 A | 1/2010 |
| CN | 104063677 A | 9/2014 |
| CN | 106931960 A | 7/2017 |
| CN | 108245893 A | 7/2018 |

OTHER PUBLICATIONS

Tencent Technology, WO, PCT/CN2018/117008, Feb. 27, 2019, 4 pgs.
Tencent Technology, IPRP, PCT/CN2018/117008, Aug. 11, 2020, 5 pgs.

* cited by examiner

METHOD, DEVICE AND MEDIUM FOR DETERMINING POSTURE OF VIRTUAL OBJECT IN VIRTUAL ENVIRONMENT

CROSS REFERENCE TO RELATED APPLICATIONS

This application is a continuation application of PCT Application No. PCT/CN2018/117008, entitled "METHOD AND DEVICE FOR DETERMINING ATTITUDE OF VIRTUAL OBJECT IN VIRTUAL ENVIRONMENT AND MEDIUM" filed on Nov. 22, 2018, which claims priority to Chinese Patent Application No. 201810136822.0, entitled "POSTURE DETERMINING METHOD AND APPARATUS FOR VIRTUAL OBJECT IN THREE-DIMENSIONAL VIRTUAL ENVIRONMENT, AND MEDIUM" filed with the Chinese National Intellectual Property Administration on Feb. 9, 2018, all of which are incorporated by reference in their entirety.

FIELD OF THE TECHNOLOGY

Embodiments of this application relate to the field of computer graphics processing, and in particular, to a posture determining method and apparatus for a virtual object in a virtual environment, and a readable medium.

BACKGROUND OF THE DISCLOSURE

There are many application programs provided with a three-dimensional virtual environment on an electronic device such as a smartphone or a tablet computer. The application programs are, for example, a virtual reality application program, a three-dimensional map program, a military simulation program, a first-person shooting game (FPS), and a multiplayer online battle arena game (MOBA).

In the foregoing application programs, three-dimensional effects of display elements such as virtual characters, virtual objects, and the ground are achieved by using three-dimensional models. A virtual character may be in a walking posture, a sitting posture, a standing posture, a flat-lying posture, and a creeping posture in a three-dimensional virtual environment. In a case that a user requires the virtual character to lie prone or move forward on the ground in a creeping posture, generally, the virtual character may lie prone along a horizontal direction in the three-dimensional virtual environment after the user triggers a creeping instruction on a user interface of an application program.

In a case that the ground is in a relatively complicated condition, for example, the ground is uneven or an obstacle exists on the ground, some regions of the body of the virtual character lying prone along the horizontal direction may be embedded into the ground or warped up in the air, which is not consistent with an actual physical law, and consequently the reality of the three-dimensional virtual environment is reduced.

SUMMARY

Embodiments of this application provide a posture determining method and apparatus for a virtual object in a virtual environment, and a readable medium, to resolve or alleviate the problem that the actual physical law is not met in a case that a virtual character lies prone along the horizontal direction and consequently the reality of the virtual environment is reduced. The technical solutions are as follows:

According to an aspect, an embodiment of this application provides a method for determining a posture of a virtual object in a virtual environment, applied to an electronic device having one or more processors and memory storing a plurality of programs to be executed by the one or more processors, the method comprising:

determining at least one sampling point of the virtual object, the sampling point being a point used for performing collision detection relative to the ground;

determining a normal direction of the virtual object relative to the ground at the at least one sampling point and the ground on which the virtual object is located;

determining a ground-hugging posture of the virtual object in the virtual environment according to the normal direction; and rendering the virtual object in the virtual environment according to the ground-hugging posture.

According to another aspect, an electronic device is further provided, including one or more processors and memory, the memory storing at least one instruction, at least one program, a code set or an instruction set, and the at least one instruction, the at least one program, the code set or the instruction set being loaded and executed by the processor to implement the posture determining method for a virtual object in a virtual environment according to the first aspect of this application and any one of the optional embodiments.

According to another aspect, a non-transitory computer-readable storage medium is further provided, the computer-readable storage medium storing at least one instruction, at least one program, a code set or an instruction set, and the at least one instruction, the at least one program, the code set or the instruction set being loaded and executed by a processor of an electronic device to implement the posture determining method for a virtual object in a virtual environment according to the first aspect of this application and any one of the optional embodiments.

Beneficial effects brought by the technical solutions provided in the embodiments of this application are at least as follows:

The normal direction of the ground on which the virtual object is located is determined according to the sampling point, and the ground-hugging posture of the virtual object in the virtual environment is obtained according to the normal direction. Because the ground-hugging posture is determined and obtained according to the normal direction of the ground, a similar plane of the ground on which the virtual object is located may be simulated according to the normal direction, and the virtual object may hug the ground in a posture parallel to the similar plane. In this way, the ground-hugging state of the virtual object is more consistent with the actual physical law, and a more real display effect is provided.

DESCRIPTION OF EMBODIMENTS

Figure 1:
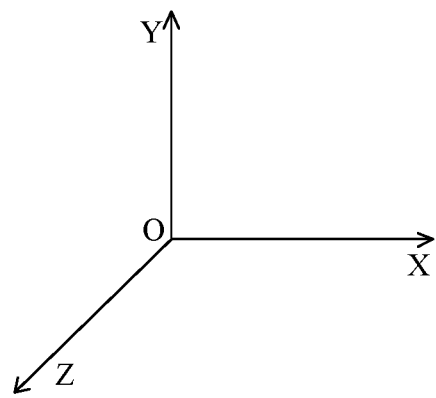
FIG. 1 is a schematic diagram of a ground coordinate axis according to an exemplary embodiment of this application.

To make objectives, technical solutions, and advantages of this application clearer, the following further describes in detail implementations of this application with reference to the accompanying drawings.

First, terms described in the embodiments of this application are explained as follows:

Virtual environment: a virtual environment displayed (or provided) by an application program when run on an electronic device. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment, description is made by using an example in which the virtual environment is a three-dimensional virtual environment in the following embodiments, but this is not limited. Optionally, the virtual environment is further used for a virtual environment battle between at least two virtual roles. Optionally, the virtual environment is further used for a battle performed between at least two virtual roles by using virtual guns. Optionally, the virtual environment is further used for a battle performed between at least two virtual roles by using virtual guns in a range of a target region, and the range of the target region may be continuously decreased as time goes by in the virtual environment. In the embodiments of this application, description is made by using an example in which the virtual environment is a three-dimensional virtual environment.

Virtual object: a movable object in a virtual environment. The movable object may be a virtual character, a virtual animal, a cartoon character, or the like, for example, a character, an animal, a plant, an oil drum, a wall, or a stone displayed in a virtual environment. Optionally, the virtual object is a three-dimensional model created based on a skeletal animation technology. Each virtual object has a shape and a volume in the virtual environment, and occupies some space in the virtual environment. Generally, one virtual object includes one central point. In a case that the virtual object is a regular object, the central point is a geometric center of the virtual object; and in a case that the virtual object is an irregular object, the central point may be preset according to a motion state of the virtual object.

Sampling point: a point used for performing collision detection on the virtual object relative to the ground. There may be one, two, three, or more sampling points. In addition, a selection manner for the sampling point may be changed according to different quantities of the sampling points. For example, in a case that there is one sampling point, the central point of the virtual object may be determined as the sampling point; in a case that there are two sampling points, a front sampling point and a rear sampling point may be selected as the sampling points according to the central point of the virtual object; and in a case that there are three sampling points, a front sampling point, a rear sampling point, and a side sampling point may be selected as the sampling points according to the central point of the virtual object. The central point is a central point of the virtual object, the front sampling point is a front point located at a first distance from the central point and facing the virtual object, the rear sampling point is a rear point located at a second distance from the central point and facing opposite to the virtual object, and the side sampling point is a left point located at a third distance from the central point or a right point located at a fourth distance from the central point. The sampling point may be located inside the three-dimensional model of the virtual object, or may be located outside the three-dimensional model of the virtual object, and this is not limited in this application.

The ground-hugging posture includes, but is not limited to: at least one of a prone posture, a supine posture, and a creeping posture. Optionally, the ground-hugging posture is a posture presented by the virtual object in the virtual environment. Optionally, the ground-hugging posture includes at least one angle of a pitch angle, a yaw angle, and a roll angle of the three-dimensional model of the virtual object relative to the ground coordinate system at the time of hugging the ground.

Ground-hugging point: a point obtained by performing collision detection on the virtual object relative to the ground in a case that the virtual object is in a ground-hugging posture in the virtual environment. Optionally, the ground-hugging point is at least one point obtained on the ground through collision detection performed relative to the ground by using the sampling point.

Collision detection: a technology used for detecting a collision between different virtual objects in a virtual environment, for example, in the virtual environment, a collision between virtual characters, a collision between a virtual character and a wall, or a collision between a virtual character and the ground. Optionally, one sampling point may be determined according to the virtual object, and collision detection may be performed on the virtual object and another virtual object by using the sampling point.

Ground coordinate system: used for measuring parameters such as coordinates, direction vectors, and motion vectors of a virtual object in a virtual environment. Generally, as shown in FIG. 1, the ground coordinate system includes three coordinate axes: an x axis, a y axis, and a z axis. Optionally, a plane on which the x axis and the z axis are located is a horizontal plane, that is, a reference plane, and an upper semi-axis of the y axis represents a height relative to the ground. Posture parameters of the virtual object in the virtual environment include coordinates (X, Y, Z), where X and Z represent the coordinates of the virtual object relative to the ground, and Y represents the height of the virtual object relative to the ground.

Figure 2:
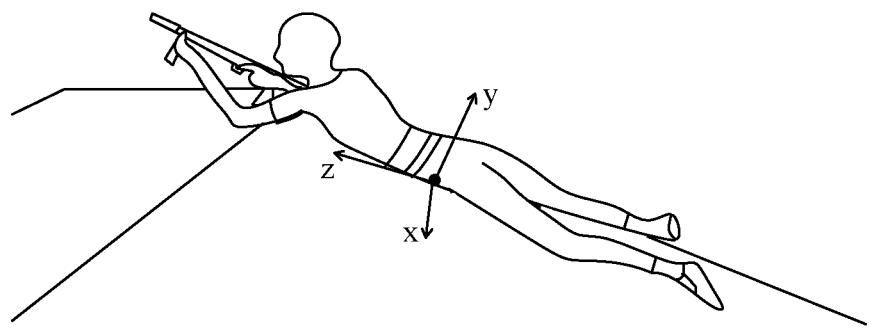
FIG. 2 is a schematic diagram of an object coordinate axis according to an exemplary embodiment of this application.

Object coordinate system: a coordinate system made by using the central point of the virtual object as an origin, and the object coordinate system is used for measuring parameters such as a location, an angle, and a distance of the virtual object relative to the virtual environment with reference to the ground coordinate system. Generally, as shown in FIG. 2, the object coordinate system includes three coordinate axes: an x axis, a y axis, and a z axis. Optionally, description is made by using an example in which the virtual object is a virtual character. The x axis is a coordinate axis starting from the origin and pointing to the left side of the body, the z axis is a coordinate axis starting from the origin and pointing to the top of the head, and the y axis is an upward coordinate system starting from the origin and perpendicular to the back, where every two of the x axis, the y axis, and the z axis are perpendicular. Optionally, in a case that the virtual character is in a ground-hugging posture and the back faces up, a direction of the y axis is a direction of a normal made according to a ground-hugging point of the virtual character on the ground.

Three rotation angles, which may also be referred to as Euler angles, of the virtual object may be obtained with reference to the ground coordinate system and the object coordinate system, and the three angles are a pitch angle, a yaw angle, and a roll angle.

The pitch angle refers to an angle between the z axis in the object coordinate system and a horizontal plane in the ground coordinate system. In a case that a facing direction of a positive semi-axis of the z axis in the object coordinate system is located above the horizontal plane of an origin of the ground coordinate system, the pitch angle is positive; and in a case that the facing direction of the positive semi-axis of the z axis in the object coordinate system is located below the horizontal plane of the origin of the ground coordinate system, the pitch angle is negative.

The yaw angle refers to an angle between a projection of the z axis of the object coordinate system on the horizontal plane of the ground coordinate system and the x axis in the ground coordinate system.

The roll angle refers to an angle between the y axis of the object coordinate system and a plumb plane, that is, an XOY plane, passing through the x axis of the ground coordinate system.

The electronic device in this application may be a mobile phone, a tablet computer, an ebook reader, a Moving Picture Experts Group Audio Layer III (MP3) player, a Moving Picture Experts Group Audio Layer IV (MP4) player, a laptop computer, a desktop computer, or the like. An application program supporting a virtual environment is installed and run on the electronic device.

Figure 3:
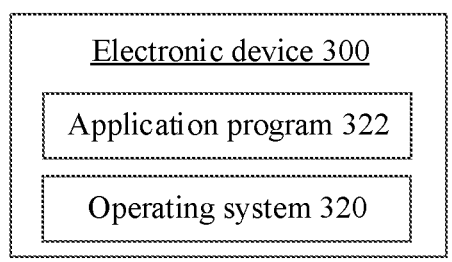
FIG. 3 is a schematic diagram of an implementation environment according to an exemplary embodiment of this application.

FIG. 3 shows a structural block diagram of an electronic device according to an exemplary embodiment of this application. The electronic device 300 includes an operating system 320 and an application program 322.

The operating system 320 is basic software provided for the application program 322 to perform secure access to computer hardware.

The application program 322 is an application program supporting a virtual environment. Optionally, the application program 322 is an application program supporting a three-dimensional virtual environment. The application program 322 may be any one of a virtual reality application program, a map program, a military simulation program, a third-person shooting (TPS) game, a first-person shooting (FPS) game, an MOBA game, and a multiplayer shooting survival game. The application program 322 may be a standalone application program, such as a standalone 3D game program.

Figure 4:
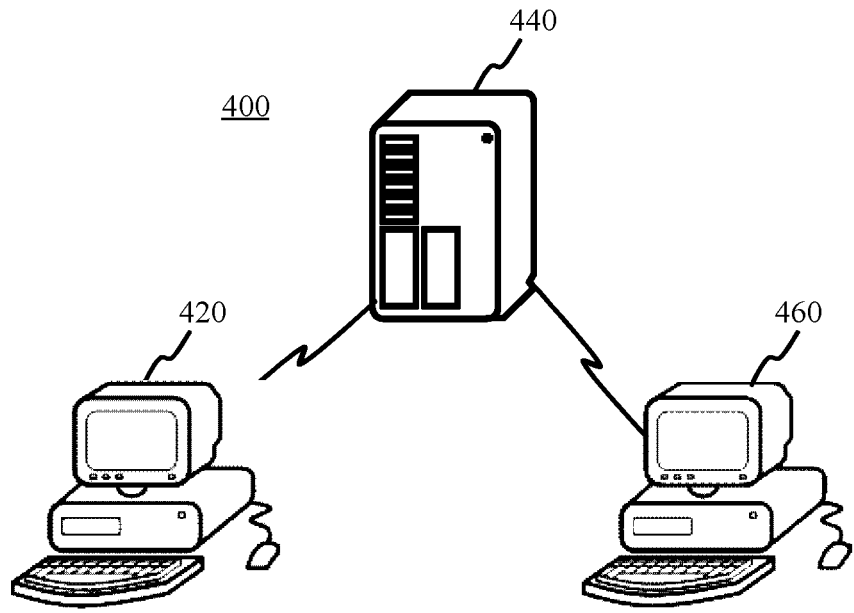
FIG. 4 is a schematic diagram of an implementation environment according to another exemplary embodiment of this application.

FIG. 4 shows a structural block diagram of a computer system according to an exemplary embodiment of this application. The computer system 400 includes a first device 420, a server 440, and a second device 460.

An application program supporting a virtual environment is installed and run on the first device 420. The application program may be any one of a virtual reality application program, a three-dimensional map program, a military simulation program, a TPS game, an FPS game, an MOBA game, and a multiplayer shooting survival game. The first device 420 is a device used by a first user, the first user uses the first device 420 to control a first virtual object in the virtual environment to perform a movement, and the movement includes, but is not limited to, at least one of body posture adjustment, crawling, walking, running, cycling, jumping, driving, picking, shooting, attacking, and throwing. For example, the first virtual object is a first virtual character, such as a simulated character role or a cartoon character role.

The first device 420 is connected to the server 440 by using a wireless network or a wired network.

The server 440 includes at least one of one server, a plurality of servers, a cloud computing platform, and a virtualization center. The server 440 is configured to provide background services for the application program supporting a virtual environment. Optionally, the server 440 takes on primary computing work, the first device 420 and the second device 460 take on secondary computing work; alternatively, the server 440 takes on the secondary computing work, and the first device 420 and the second device 460 take on the primary computing work; alternatively, collaborative computing is performed by using a distributed computing architecture among the server 440, the first device 420, and the second device 460.

An application program supporting a virtual environment is installed and run on the second device 460. The application program may be any one of a virtual reality application program, a three-dimensional map program, a military simulation program, an FPS game, an MOBA game, and a multiplayer shooting survival game. The second device 460 is a device used by a second user, the second user uses the second device 460 to control a second virtual object in the virtual environment to perform a movement, and the movement includes, but is not limited to, at least one of body posture adjustment, crawling, walking, running, cycling, jumping, driving, picking, shooting, attacking, and throwing. For example, the second virtual object is a second virtual character, such as a simulated character role or a cartoon character role.

Optionally, the first virtual character and the second virtual character are located in the same virtual environment. Optionally, the first virtual character and the second virtual character may belong to the same team or the same organization, have a friend relationship, or have a temporary communication permission. Optionally, the first virtual character and the second virtual character may alternatively belong to different teams, different organizations, or two groups hostile to each other.

Optionally, the application programs mounted on the first device 420 and the second device 460 are the same, or the application programs mounted on the two devices are the same type of application programs of different control system platforms. The first device 420 may generally refer to one of a plurality of devices, the second device 460 may generally refer to one of a plurality of devices, and in this embodiment, and description is made by using only the first device 420 and the second device 460 as an example. The type of the first device 420 and the type of the second device 460 may be the same or may be different. The device type includes at least one of a game console, a desktop computer, a smartphone, a tablet computer, an ebook reader, an MP3 player, an MP4 player, and a laptop computer. In the following embodiments, description is made by using an example in which the device is a desktop computer.

A person skilled in the art may learn that there may be more or fewer devices. For example, there may be only one device, or there may be dozens of or hundreds of or more devices. The quantity and the device type of the device are not limited in the embodiments of this application.

Figure 5:
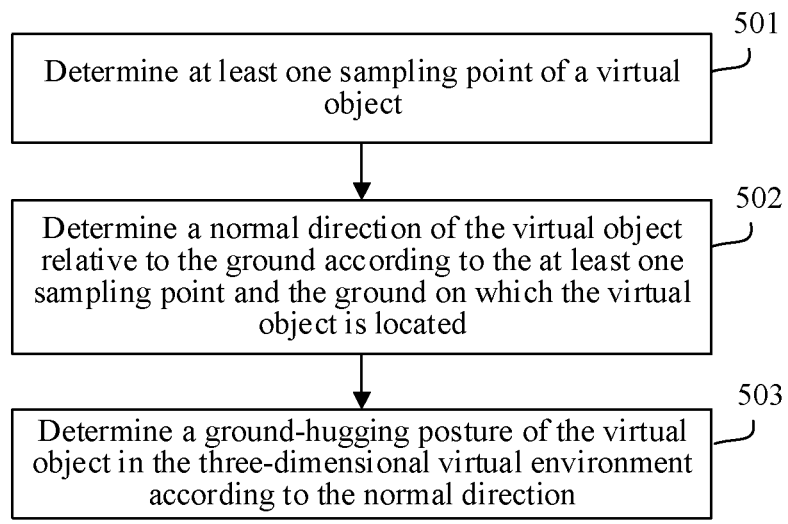
FIG. 5 is a flowchart of a posture determining method for a virtual object in a virtual environment according to an exemplary embodiment of this application.

FIG. 5 is a flowchart of a posture determining method for a virtual object in a virtual environment according to an exemplary embodiment of this application. In this embodiment, description is made by using an example in which the posture determining method for the virtual object is applied to an electronic device, and the posture determining method for the virtual object includes:

Step 501: Determine at least one sampling point of a virtual object.

Optionally, the sampling point is a point used for performing collision detection on the virtual object relative to the ground.

Optionally, the at least one sampling point of the virtual object may be determined according to the central point of the virtual object, or may be preset.

The central point of the virtual object may be preset. Optionally, in a case that the virtual object is a regular object, the central point may be a geometric center of the virtual object, such as a geometric center of a cube, a geometric center of a sphere, or a geometric center of a cuboid; and in a case that the virtual object is an irregular object, the central point may be a central point preset according to a motion state of the virtual object. Description is made by using an example in which the virtual object is a virtual character: in a case that the virtual character is in a standing posture, the central point of the virtual character is a preset point in the belly; and in a case that the virtual character is in a crouching posture, the central point of the virtual character is a preset point in the chest.

Optionally, there may be one, two, or three sampling points, and this is not limited in this embodiment of this application.

Step 502: Determine a normal direction of the virtual object relative to the ground according to the at least one sampling point and the ground on which the virtual object is located.

Optionally, the electronic device may determine a normal direction of the virtual object relative to the ground according to the at least one sampling point and the ground on which the virtual object is located, and the normal direction is a direction perpendicular to the ground.

Optionally, the ground is a non-horizontal ground, and the non-horizontal ground includes at least one of a region having a gradient, a cambered region, a sunken region, and a protruding region. In a case that the ground is a non-horizontal ground, the normal direction is used for representing, in a case that the non-horizontal ground is considered as a similar plane, a vertical direction of the virtual object relative to the similar plane.

Optionally, the normal direction is defined from the perspective of a mathematical principle, and the similar plane unnecessarily needs to be actually obtained through computing. In this application, the normal direction may be directly computed according to a sampling point, and the similar plane and/or a determining manner for the normal direction are not limited in this application.

Step 503: Determine a ground-hugging posture of the virtual object in the virtual environment according to the normal direction.

Optionally, the electronic device rotates the virtual object according to the normal direction, so that the virtual object is parallel to the similar plane corresponding to the non-horizontal ground at the time of hugging the ground, to obtain a ground-hugging posture, which is more consistent with an actual physical law, of the virtual object in the virtual environment.

Based on the above, according to the posture determining method for a virtual object in a virtual environment provided in this embodiment, the normal direction of the ground on which the virtual object is located is determined according to the sampling point, and the ground-hugging posture of the virtual object in the virtual environment is obtained according to the normal direction. Because the ground-hugging posture is determined and obtained according to the normal direction of the ground, a similar plane of the ground on which the virtual object is located may be simulated according to the normal direction, and the virtual object may hug the ground in a direction parallel to the similar plane. In this way, the ground-hugging state of the virtual object is more consistent with the actual physical law, and a more real display effect is provided.

Figure 6:
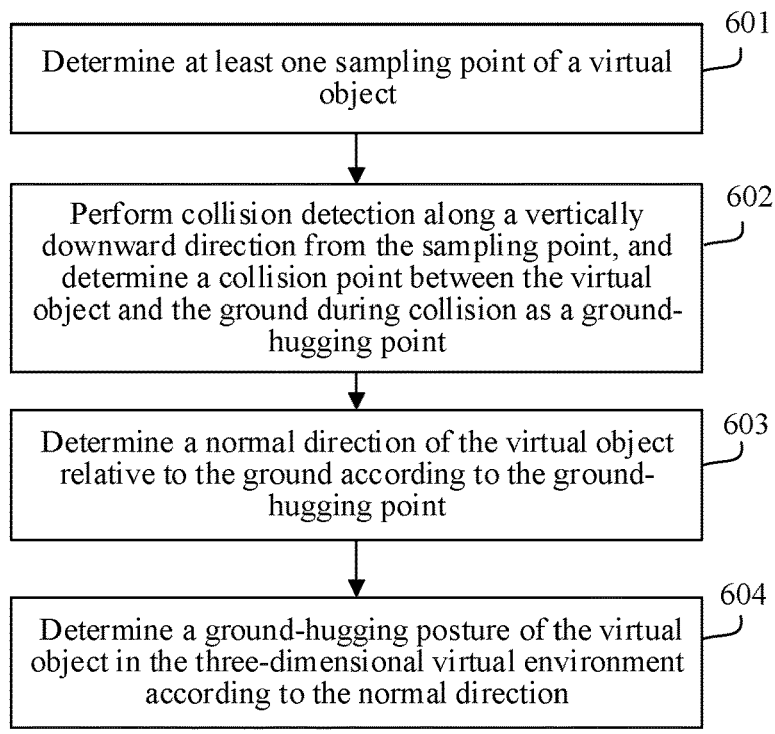
FIG. 6 is a flowchart of a posture determining method for a virtual object in a virtual environment according to another exemplary embodiment of this application.

In an optional embodiment, after obtaining the ground-hugging point by performing collision detection on the ground according to the sampling point, the electronic device determines the normal direction of the virtual object relative to the ground according to the ground-hugging point. FIG. 6 is a flowchart of a posture determining method for a virtual object in a virtual environment according to another exemplary embodiment of this application. Description is made by using an example in which the posture determining method for the virtual object is applied to an electronic device. As shown in FIG. 6, the posture determining method includes:

Step 601: Determine at least one sampling point of a virtual object.

Optionally, the sampling point is a point used for performing collision detection relative to the ground.

Optionally, the at least one sampling point of the virtual object may be determined according to the central point of the virtual object, or may be preset.

Step 602. Perform collision detection along a vertically downward direction from the sampling point, and determine a collision point between the virtual object and the ground during collision as a ground-hugging point.

The virtual object and the ground have respective three-dimensional models. Collision detection is used for determining a location of the collision of the three-dimensional model of the virtual object and the three-dimensional model of the ground in a ground-hugging state.

Figure 7:
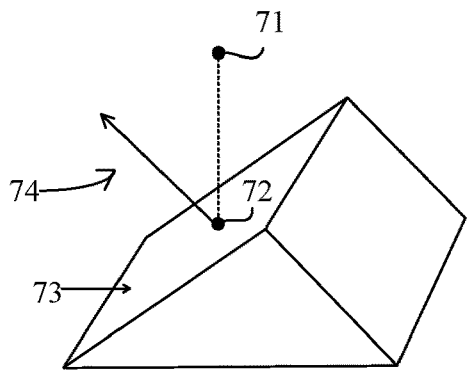
FIG. 7 is a schematic diagram of a posture determining method for a virtual object in a virtual environment according to an exemplary embodiment of this application.

Exemplarily, description is made by using an example in which there is one sampling point. Referring to FIG. 1 and FIG. 7, the vertically downward direction is a reversed direction of the y axis of the ground coordinate axis in FIG. 1, and the sampling point is a sampling point 71 in FIG. 7. Collision detection is performed from the sampling point 71 along the reversed direction of the y axis, to obtain a collision point between the virtual object and the ground as a ground-hugging point 72, and the ground-hugging point 72 is a point on a slope 73.

Step 603: Determine a normal direction of the virtual object relative to the ground according to the ground-hugging point.

Optionally, in a case that there is one ground-hugging point, the normal direction is a direction of a normal made starting from the ground-hugging point and perpendicular to the ground (or a tangent plane of a cambered ground); in a case that there are two ground-hugging points, the normal direction is a direction perpendicular to a connecting line of the two points; and in a case that there are three ground-hugging points, the normal direction is a direction perpendicular to a plane formed by the three points.

Figure 8:
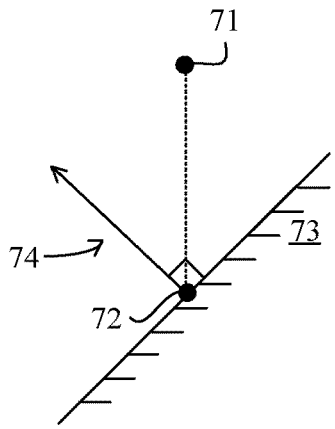
FIG. 8 is a schematic diagram of a posture determining method for a virtual object in a virtual environment according to another exemplary embodiment of this application.

Exemplarily, description is made by using an example in which there is one ground-hugging point. Referring to FIG. 7 and FIG. 8, in FIG. 8, the slope 73 is shown in a form of a cross section. A normal 74 perpendicular to the slope 73 is made at the ground-hugging point 72, and a direction of the normal 74 is a normal direction determined according to the ground-hugging point 72.

Figure 9:
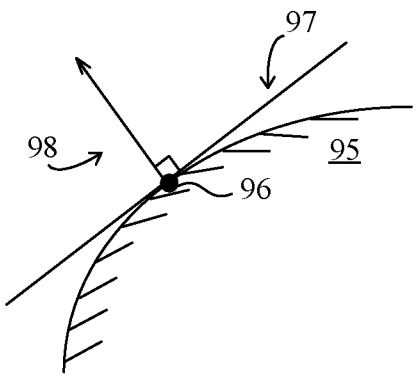
FIG. 9 is a schematic diagram of a posture determining method for a virtual object in a virtual environment according to another exemplary embodiment of this application.

Optionally, in a case that the ground is a cambered ground, the normal direction is a direction made starting from the ground-hugging point and perpendicular to a tangent plane on which the ground-hugging point is located, and the tangent plane is tangent to the ground on which the ground-hugging point is located. Referring to FIG. 9, a cambered surface 95 is a cross section of the ground. There is a ground-hugging point 96 located on the cambered surface 95, and a tangent plane 97 tangent to the cambered surface 95 is determined at the ground-hugging point 96, and a normal 98 perpendicular to the tangent plane 97 is made at the ground-hugging point 96, where a direction of the normal 98 is a normal direction determined according to the ground-hugging point 96.

Step 604: Determine a ground-hugging posture of the virtual object in the virtual environment according to the normal direction.

Optionally, the virtual object is rotated according to the normal direction, and the virtual object is rotated to a state of being parallel to a similar plane perpendicular to the normal, to obtain a ground-hugging posture of the virtual object in a virtual environment.

The rotating the virtual object according to the normal direction includes: increasing or decreasing a pitch angle of the virtual object in a virtual environment according to the normal direction, and/or increasing or decreasing a roll angle of the virtual object in a virtual environment according to the normal direction.

Based on the above, according to the posture determining method for a virtual object in a virtual environment provided in this embodiment, a ground-hugging point is obtained by performing collision detection in a vertically downward direction by using a sampling point, and a normal direction of the ground on which the virtual object is currently located is calculated by using the ground-hugging point, to improve the accuracy at the time of calculating the normal direction.

According to the foregoing description, there may be one, two, or three sampling points determined by the electronic device for the virtual object, and descriptions are made below respectively with reference to the three cases.

Figure 10:
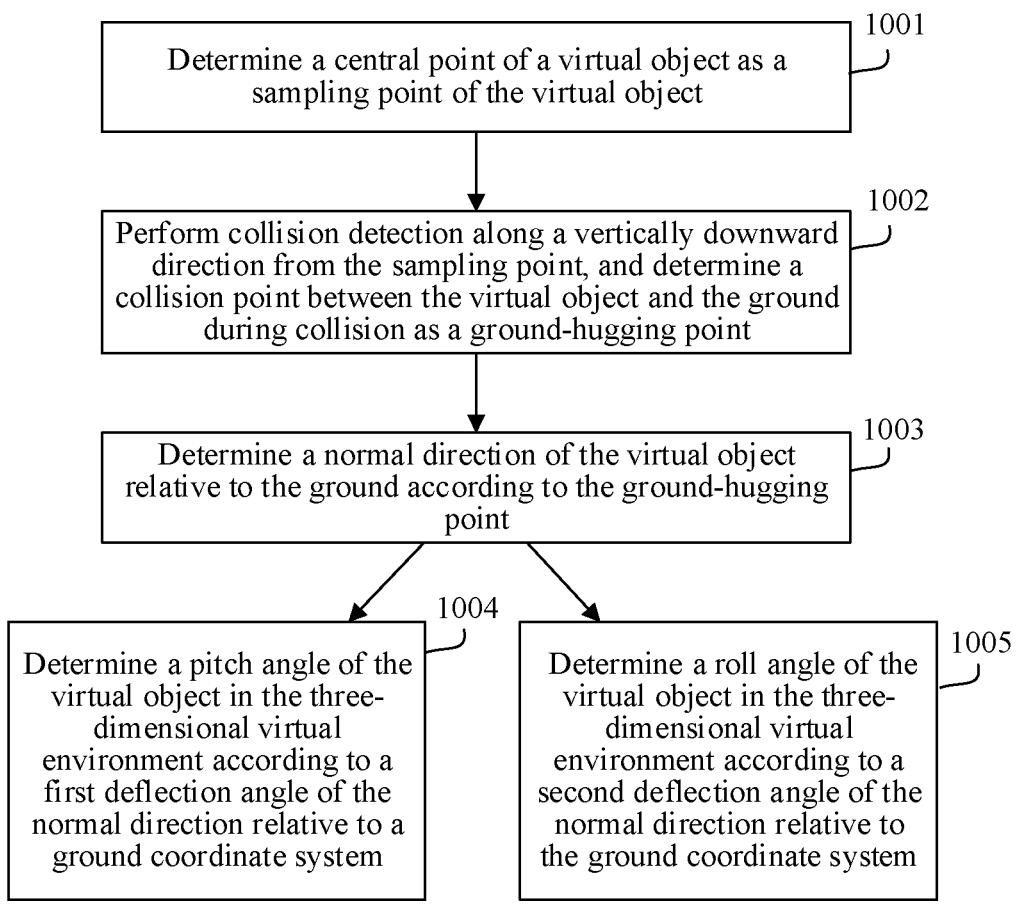
FIG. 10 is a flowchart of a posture determining method for a virtual object in a virtual environment according to another exemplary embodiment of this application.

First, a description is made with reference to a case that one sampling point is determined. FIG. 10 is a flowchart of a posture determining method for a virtual object in a virtual environment according to another exemplary embodiment of this application. Description is made by using an example in which the posture determining method for the virtual object is applied to an electronic device. As shown in FIG. 10, the posture determining method includes:

Step 1001: Determine a central point of a virtual object as a sampling point of the virtual object.

Optionally, the central point of the virtual object may be preset.

The electronic device may determine the central point of the virtual object as the sampling point of the virtual object.

Step 1002. Perform collision detection along a vertically downward direction from the sampling point, and determine a collision point between the virtual object and the ground during collision as a ground-hugging point.

The electronic device performs collision detection along a vertically downward direction from the central point of the virtual object, and determines a collision point between the virtual object and the ground during collision as a ground-hugging point.

Step 1003: Determine a normal direction of the virtual object relative to the ground according to the ground-hugging point.

Optionally, the electronic device makes a first vertical line starting from the ground-hugging point and perpendicular to the ground, and determines a normal direction of the virtual object relative to the ground according to the first vertical line. Optionally, the normal direction is a direction of the first vertical line.

Exemplarily, the normal direction of the virtual object relative to the ground is represented by using vectors (NormalVector.X, NormalVector.Y, NormalVector.Z).

Step 1004. Determine a pitch angle of the virtual object in the virtual environment according to a first deflection angle of the normal direction relative to a ground coordinate system.

Optionally, the normal direction is used as a direction of a y axis of an object coordinate system of the virtual object, and then a pitch angle of the virtual object in the virtual environment is determined.

Optionally, after the normal direction is used as the direction of the y axis of the object coordinate system of the virtual object, an angle between a positive semi-axis of a z axis in the object coordinate system and a horizontal plane in the ground coordinate system, namely, the XOZ plane, is calculated, the angle is the foregoing first deflection angle, and the pitch angle is an angle obtained by reversing the first deflection angle; alternatively, after the normal direction is used as the direction of the y axis of the object coordinate system of the virtual object, an angle between a positive semi-axis of the y axis in the object coordinate system and a positive semi-axis of the y axis in the ground coordinate system is calculated, the angle is the foregoing first deflection angle, and the pitch angle is an angle obtained by reversing the first deflection angle.

For example, an object coordinate system is established by using the central point of the virtual object as an origin, the normal is used as a y axis of the object coordinate system, and an x axis and a y axis are respectively made perpendicular to the y axis. Description is made by using an example in which the virtual object is a virtual character. The x axis is a coordinate axis starting from the origin and pointing to the left side of the body, the z axis is a coordinate axis starting from the origin and pointing to the top of the head, and the y axis is an upward coordinate system starting from the origin and perpendicular to the back, where every two of the x axis, the y axis, and the z axis are perpendicular. Optionally, in a case that the virtual character is in a ground-hugging posture and the back faces up, a direction of the y axis is a direction of a normal made according to a ground-hugging point of the virtual character on the ground.

Figure 11:
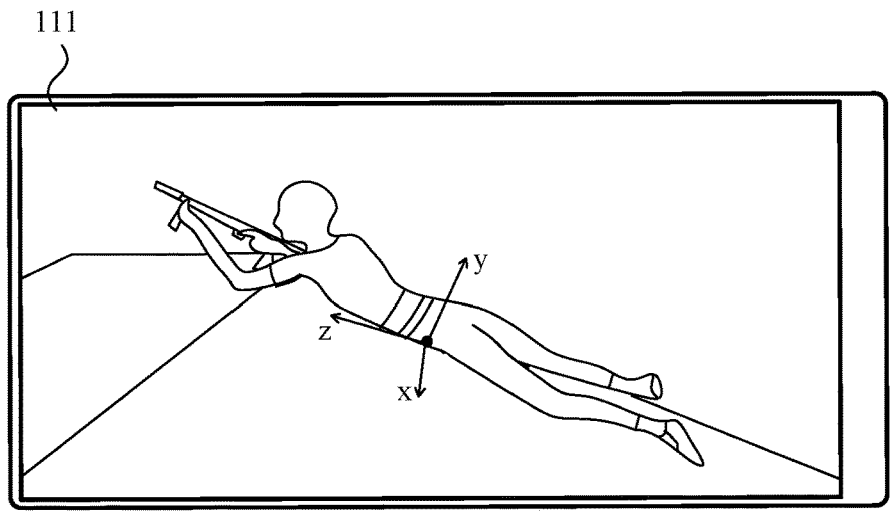
FIG. 11 is a schematic diagram of a user interface according to an exemplary embodiment of this application.

Referring to a user interface 111 shown in FIG. 11, a coordinate axis x, a coordinate axis y, and a coordinate axis z in the user interface 111 are all exemplarily described. In an actual embodiment, the user interface 111 does not necessarily display the foregoing coordinate axes.

Optionally, the first deflection angle is a deflection angle of the normal direction relative to the y axis in the ground coordinate system, that is, a deflection angle determined according to the NormalVector.X and the NormalVector.Z, and the pitch angle is an angle obtained by reversing the first deflection angle.

Optionally, the pitch angle may be obtained according to the following code:

float pitch=$F$Math::$A$ tan 2(NormalVector.$X$,NormalVector.$Z$)*-1.$f$, where FMath::A tan 2 is to invoke a static method A tan 2 in FMath class, float is a floating point number, and "*-1.f" is used for reversing an obtained first deflection angle and reserving the floating point number.

Step 1005. Determine a roll angle of the virtual object in the virtual environment according to a second deflection angle of the normal direction relative to the ground coordinate system.

Optionally, after the normal direction is used as the direction of the y axis of the object coordinate system of the virtual object, an angle between the y axis in the object coordinate system and a plumb plane passing through the x axis of the ground coordinate system, that is, an angle between the y axis in the object coordinate system and the XOY plane is calculated. The angle is the foregoing second deflection angle, and the roll angle is an angle obtained by reversing the second deflection angle.

Optionally, the second deflection angle is a deflection angle between the normal direction and the XOY plane of the ground coordinate system, that is, a deflection angle determined according to the NormalVector.Y and the NormalVector.Z, and the roll angle is an angle obtained by reversing the second deflection angle.

Optionally, the roll angle may be obtained according to the following code:

float roll=$F$Math::$A$ tan 2(NormalVector.$Y$,NormalVector.$Z$)*-1.$f$, where FMath::A tan 2 is to invoke a static method A tan 2 in FMath class, float is a floating point number, and "*-1.f" is used for reversing an obtained deflection angle and reserving the floating point number.

Optionally, after the pitch angle and the roll angle of the virtual object are obtained, the virtual object is rotated by using the pitch angle and the roll angle, that is, an initial pitch angle of the virtual object is increased or decreased with reference to the pitch angle and an initial roll angle of the virtual object is increased or decreased with reference to the roll angle, and the rotated virtual object hugs the ground in a ground-hugging posture.

The increase or decrease of the pitch angle and the roll angle is determined according to a rotation situation of the virtual object in an actual operation.

Optionally, the virtual object may be rotated according to the pitch angle and the roll angle according to the following code:

$F$Rotator characterRotation=$F$Rotator(Pitch,0.0$f$, Roll), where FRotator is used for indicating one rotation manner, characterRotation is used for indicating a rotation angle of the virtual object, and 0.0 f is used for indicating that the virtual object does not need to be rotated according to the yaw angle.

Based on the above, according to the posture determining method for a virtual object in a virtual environment provided in this embodiment, in a case that a slope is relatively flat, it is ensured, by calculating a normal direction of the ground, that the virtual object can achieve a relatively ideal ground-hugging state in each of different directions of coordinate axes. In this way, a case that some regions of the body of a character in a ground-hugging posture are embedded into the ground or an obstacle is reduced, which is more consistent with an actual physical law.

Second, a description is made with reference to a case that two sampling points are determined according to the central point. The two sampling points are respectively a front sampling point and a rear sampling point, the front sampling point is a point used for representing an upper half of the virtual object under the ground-hugging posture, and the rear sampling point is a point used for representing a lower half of the virtual object under the ground-hugging posture.

Figure 12:
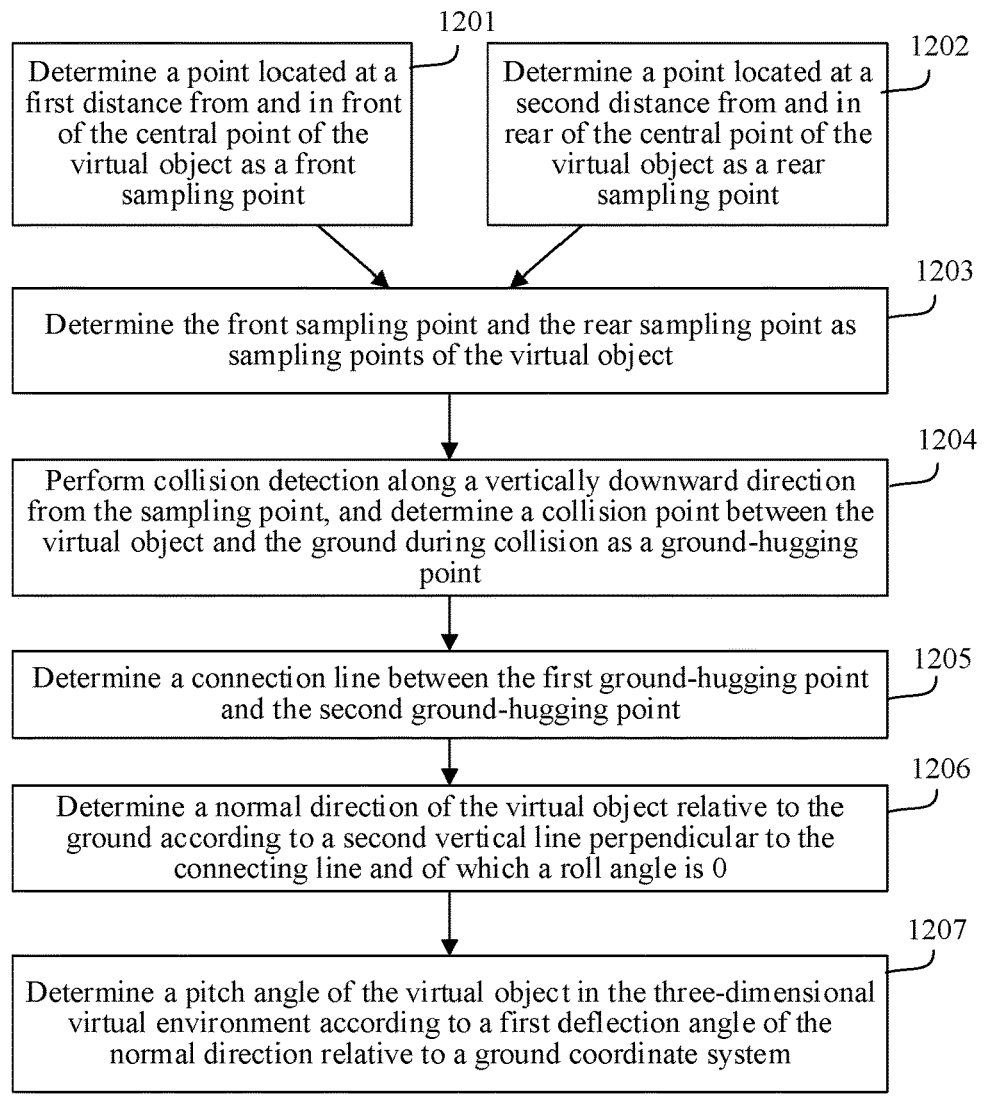
FIG. 12 is a flowchart of a posture determining method for a virtual object in a virtual environment according to another exemplary embodiment of this application.

FIG. 12 is a flowchart of a posture determining method for a virtual object in a virtual environment according to another exemplary embodiment of this application. Description is made by using an example in which the posture determining method for the virtual object is applied to an electronic device. As shown in FIG. 12, the posture determining method includes:

Step 1201: Determine a point located at a first distance from and in front of the central point of the virtual object as a front sampling point.

Optionally, the front of the central point is determined according to a direction to which the virtual object faces and a horizontal direction, where the horizontal direction is a direction perpendicular to a direction of the y axis in the ground coordinate system. The point located at a first distance from and in front of the central point of the virtual object is a point starting from the central point and moving by the first distance forward along the horizontal direction and the direction to which the virtual object faces.

Step 1202: Determine a point located at a second distance from and in rear of the central point of the virtual object as a rear sampling point.

Optionally, the rear of the central point is a reversed direction of the direction to which the virtual object faces. The point located at a second distance from and in rear of the central point of the virtual object is a point starting from the central point and moving by the second distance forward along the horizontal direction and the reversed direction of the direction to which the virtual object faces.

The first distance and the second distance may be two same distance lengths, or may be two different distance lengths.

Optionally, the first distance and the second distance are not greater than a half of a length of the virtual object.

Step 1203: Determine the front sampling point and the rear sampling point as sampling points of the virtual object.

Figure 13:
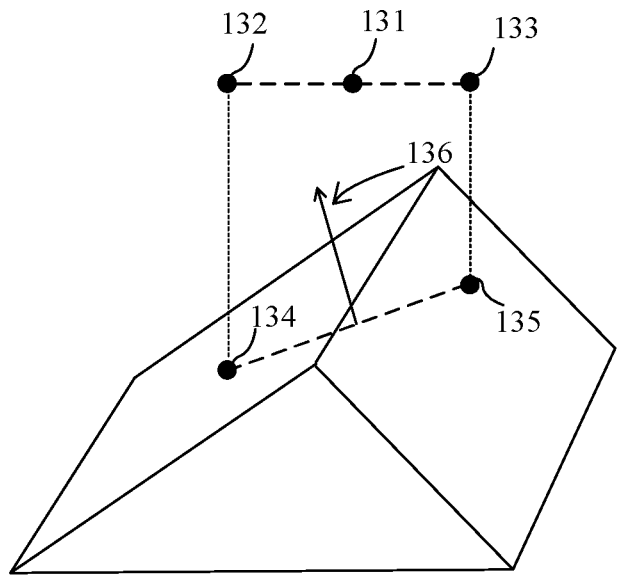
FIG. 13 is a schematic diagram of a posture determining method for a virtual object in a virtual environment according to another exemplary embodiment of this application.

Exemplarily, referring to FIG. 13, the central point of the virtual object is a central point 131, and a front sampling point 132 and a rear sampling point 133 are determined according to a direction to which the virtual object faces.

Step 1204. Perform collision detection along a vertically downward direction from the sampling point, and determine a collision point between the virtual object and the ground during collision as a ground-hugging point.

The performing collision detection along a vertically downward direction from the sampling point has been described in step 602, and details are not repeated herein again.

Optionally, collision detection is performed along a vertically downward direction from the front sampling point, and a collision point between the virtual object and the ground during the collision is determined as a first ground-hugging point; and collision detection is performed along a vertically downward direction from the rear sampling point, and a collision point between the virtual object and the ground during the collision is determined as a second ground-hugging point.

Exemplarily, referring to FIG. 13, collision detection is performed along a vertically downward direction from the front sampling point 132, to obtain the first ground-hugging point 134, and collision detection is performed along a vertically downward direction from the rear sampling point 133, to obtain the second ground-hugging point 135.

Step 1205: Determine a connection line between the first ground-hugging point and the second ground-hugging point.

Exemplarily, referring to FIG. 13, a dotted line between the first ground-hugging point 134 and the second ground-hugging point 135 is the connecting line between the first ground-hugging point 134 and the second ground-hugging point 135.

Step 1206: Determine a normal direction of the virtual object relative to the ground according to a second vertical line perpendicular to the connecting line and of which a roll angle is 0.

Optionally, the connecting line is rotated by 90 degrees to obtain a second vertical line perpendicular to the connecting line and of which a roll angle is 0. Exemplarily, referring to FIG. 13, in a case that the connecting line is a directed ray pointing from the first ground-hugging point 134 to the second ground-hugging point 135, the normal direction is a direction obtained by rotating the directed ray around the z axis of the ground coordinate system by 90 degrees, that is, a direction of a normal 136.

Optionally, the foregoing normal direction may be obtained according to the following code:

FRotator NormalRotator=(Target2−Target).Rotation( );

NormalRotator.pitch+=90.f;

FVector NormalVector=NormalRotator.Vector( )

where Target is a coordinate of the first ground-hugging point in the ground coordinate system, and Target2 is a coordinate of the second ground-hugging point in the ground coordinate system; NormalVector is used for indicating the normal; NormalRotator is used for indicating a manner for rotating the connecting line between the first ground-hugging point and the second ground-hugging point; and NormalRotator.pitch+=90.f is used for indicating that the connecting line is rotated by 90 degrees.

Step 1207. Determine a pitch angle of the virtual object in the virtual environment according to a first deflection angle of the normal direction relative to an x axis of a ground coordinate system.

Optionally, after the normal direction is used as the direction of the y axis of the object coordinate system of the virtual object, an angle between a positive semi-axis of a z axis in the object coordinate system and a horizontal plane in the ground coordinate system, namely, the XOZ plane, is calculated, the angle is the foregoing first deflection angle, and the pitch angle is an angle obtained by reversing the first deflection angle; alternatively, after the normal direction is used as the direction of the y axis of the object coordinate system of the virtual object, an angle between a positive semi-axis of the y axis in the object coordinate system and a positive semi-axis of the y axis in the ground coordinate system is calculated, the angle is the foregoing first deflection angle, and the pitch angle is an angle obtained by reversing the first deflection angle.

Figure 14:
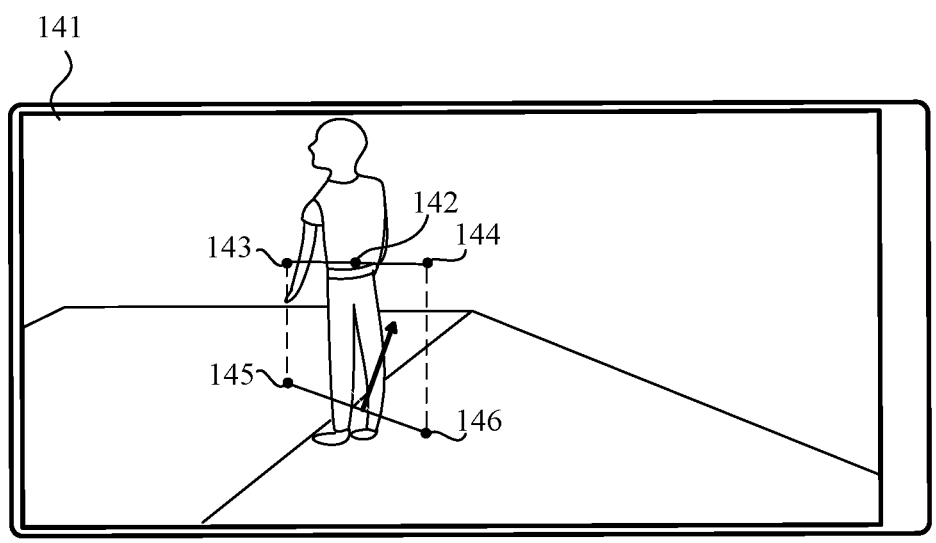
FIG. 14 is a schematic diagram of a user interface according to another exemplary embodiment of this application.
Figure 15:
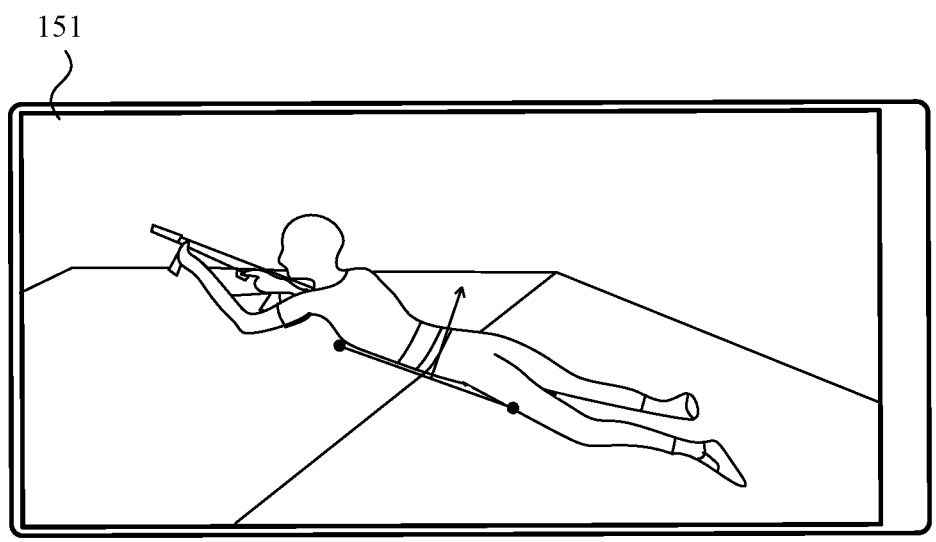
FIG. 15 is a schematic diagram of a user interface according to another exemplary embodiment of this application.

With reference to one specific embodiment, referring to FIG. 14 and FIG. 15, in a user interface 141, the virtual object stands on a slope in a standing posture, and a front sampling point 143 and a rear sampling point 144 are determined according to a central point 142 of the virtual object. Vertical collision detection is performed to the front sampling point 143 and the rear sampling point 144, to obtain a first ground-hugging point 145 and a second ground-hugging point 146, and a direction of a normal, that is, a direction to which an arrow in FIG. 14 points is determined according to a connecting line between the first ground-hugging point 145 and the second ground-hugging point 146. The virtual object is displayed in a ground-hugging posture in a user interface 151 shown in FIG. 15 according to the direction of the normal.

The front sampling point, the rear sampling point, the first ground-hugging point, the second ground-hugging point, the central point, and connecting lines between the points in FIG. 14 and FIG. 15 are all made for schematic description, and in an actual embodiment, the foregoing points and the connecting lines between the points may not be displayed in the user interface.

Based on the above, according to the posture determining method for a virtual object in a virtual environment provided in this embodiment, in a case that the ground is a junction of two slopes with different gradients or the ground is a cambered ground, one point is selected on each of the two slopes as a ground-hugging point, or two ground-hugging points are selected on the cambered ground, to avoid a case that after the virtual object is rotated by one tilt angle, most regions of the virtual object are hung in the air at the other tilt angle, to be more consistent with an actual physical law.

Third, a description is made with reference to a case that three sampling points are determined according to a central point, and the three sampling points are respectively a front sampling point, a rear sampling point, and a side sampling point. The front sampling point is a point used for representing an upper half of the virtual object under the ground-hugging posture, the rear sampling point is a point used for representing a lower half of the virtual object under the ground-hugging posture, and the side sampling point is a point used for representing a left side or a right side of the virtual object under the ground-hugging posture.

Figure 16:
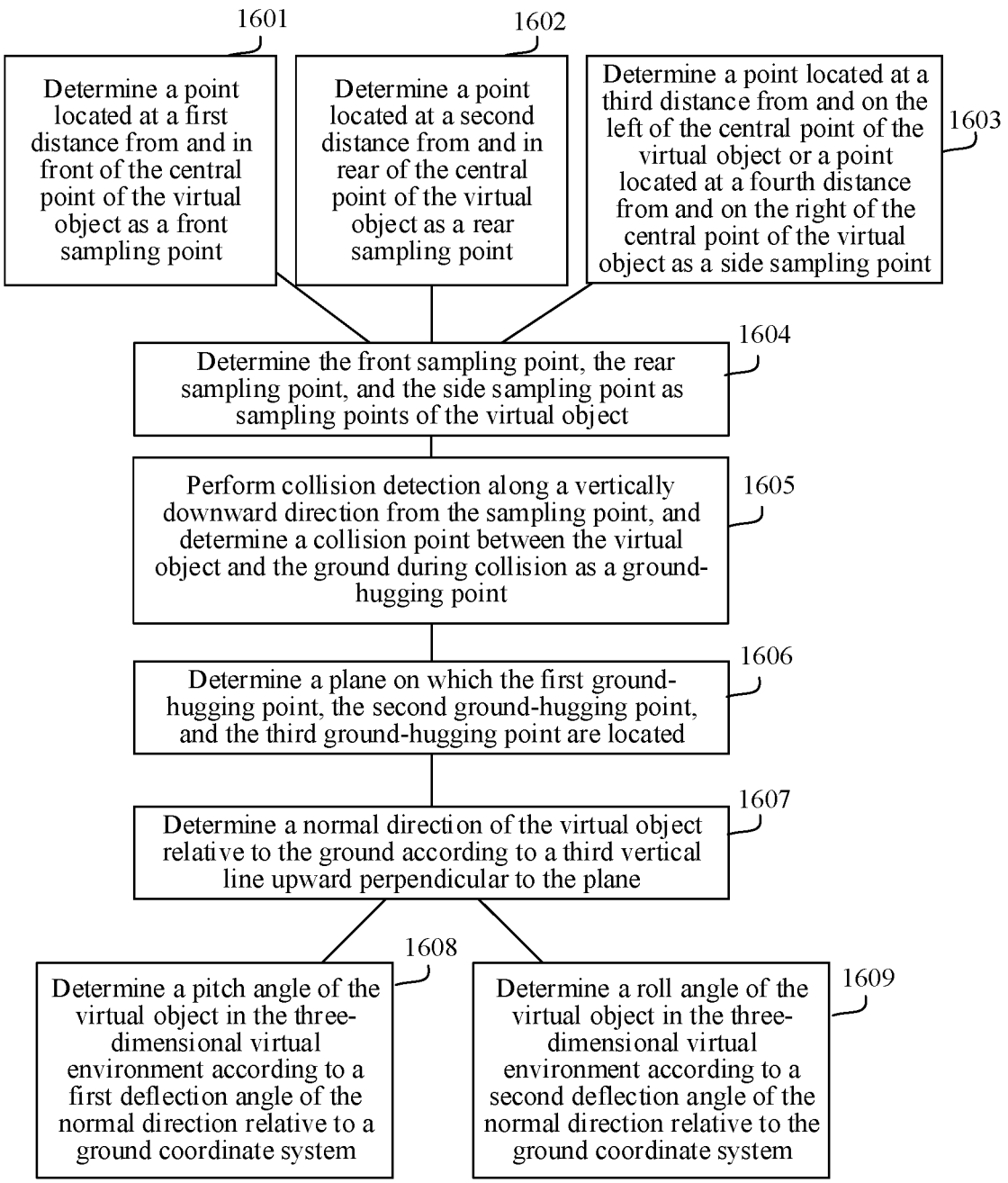
FIG. 16 is a flowchart of a posture determining method for a virtual object in a virtual environment according to another exemplary embodiment of this application.

FIG. 16 is a flowchart of a posture determining method for a virtual object in a virtual environment according to another exemplary embodiment of this application. Description is made by using an example in which the posture determining method for the virtual object is applied to an electronic device. As shown in FIG. 16, the posture determining method includes:

Step 1601: Determine a point located at a first distance from and in front of the central point of the virtual object as a front sampling point.

Optionally, the front of the central point is determined according to a direction to which the virtual object faces and a horizontal direction, where the horizontal direction is a direction perpendicular to a direction of the y axis in the ground coordinate system. The point located at a first distance from and in front of the central point of the virtual object is a point starting from the central point and moving by the first distance forward along the horizontal direction and the direction to which the virtual object faces.

Step 1602: Determine a point located at a second distance from and in rear of the central point of the virtual object as a rear sampling point.

Optionally, the rear of the central point is a reversed direction of the direction to which the virtual object faces. The point located at a second distance from and in rear of the central point of the virtual object is a point starting from the central point and moving by the second distance forward along the horizontal direction and the reversed direction of the direction to which the virtual object faces.

The first distance and the second distance may be two same distance lengths, or may be two different distance lengths.

Optionally, the first distance and the second distance are not greater than a half of a length of the virtual object.

Step 1603: Determine a point located at a third distance from and on the left of the central point of the virtual object or a point located at a fourth distance from and on the right of the central point of the virtual object as a side sampling point.

Optionally, the left of the central point is a direction perpendicular to the y axis and a left direction perpendicular to the direction to which the virtual object faces; and the right of the central point is a direction perpendicular to the y axis and a right direction perpendicular to the direction to which the virtual object faces.

Optionally, the third distance and the fourth distance are not greater than a half of a width of the virtual object.

Step 1604: Determine the front sampling point, the rear sampling point, and the side sampling point as sampling points of the virtual object.

Figure 17:
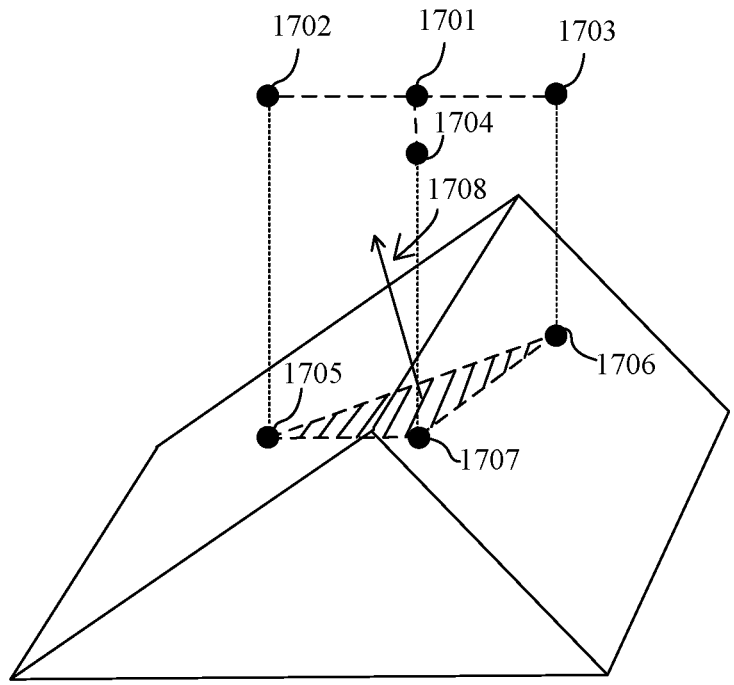
FIG. 17 is a schematic diagram of a posture determining method for a virtual object in a virtual environment according to another exemplary embodiment of this application.

Exemplarily, referring to FIG. 17, a front sampling point 1702, a rear sampling point 1703, and a side sampling point 1704 are determined according to a central point 1701 of the virtual object, and the front sampling point 1702, the rear sampling point 1703, and the side sampling point 1704 are determined as the sampling points of the virtual object.

Step 1605. Perform collision detection along a vertically downward direction from the sampling point, and determine a collision point between the virtual object and the ground during collision as a ground-hugging point.

Optionally, collision detection is performed along a vertically downward direction from the front sampling point, to determine a first ground-hugging point; collision detection is performed along a vertically downward direction from the rear sampling point, to determine a second ground-hugging point; and collision detection is performed along a vertically downward direction from the side sampling point, to determine a third ground-hugging point.

Exemplarily, referring to FIG. 17, collision detection is performed along a vertically downward direction from a front sampling point 1702, to obtain a first ground-hugging point 1705; collision detection is performed along a vertically downward direction from a rear sampling point 1703, to obtain a second ground-hugging point 1706; and collision detection is performed along a vertically downward direction from a side sampling point 1704, to obtain a third ground-hugging point 1707.

Step 1606: Determine a plane on which the first ground-hugging point, the second ground-hugging point, and the third ground-hugging point are located.

Optionally, the first ground-hugging point, the second ground-hugging point, and the third ground-hugging point are respectively connected to each other, and a plane formed by three connecting lines is the plane on which the first ground-hugging point, the second ground-hugging point, and the third ground-hugging point are located.

Exemplarily, referring to FIG. 17, a shadow portion formed by connecting lines between the first ground-hugging point 1705, the second ground-hugging point 1706, and the third ground-hugging point 1707 is a plane on which the three points are located.

Step 1607: Determine a normal direction of the virtual object relative to the ground according to a third vertical line upward perpendicular to the plane.

Being upward perpendicular to the plane means that the normal is perpendicular to the plane formed by the three points, and in direction vectors of the normal, coordinates corresponding to the y axis are positive numbers.

Step 1608. Determine a pitch angle of the virtual object in the virtual environment according to a first deflection angle of the normal direction relative to a ground coordinate system.

Optionally, the first deflection angle is a deflection angle of the normal direction relative to the y axis in the ground coordinate system, that is, a deflection angle determined according to the NormalVector.X and the NormalVector.Z, and the pitch angle is an angle obtained by reversing the first deflection angle. Optionally, the pitch angle may be obtained according to the following code:

float pitch=*F*Math::*A* tan 2(NormalVector.*X*,NormalVector.*Z*)*-1.*f*, where FMath::A tan 2 is to invoke a static method A tan 2 in FMath class, float is a floating point number, and "*-1.f" is used for reversing an obtained first deflection angle and reserving the floating point number.

Step 1609. Determine a roll angle of the virtual object in the virtual environment according to a second deflection angle of the normal direction relative to the ground coordinate system.

Optionally, after the normal direction is used as the direction of the y axis of the object coordinate system of the virtual object, an angle between the y axis in the object coordinate system and a plumb plane passing through the x axis of the ground coordinate system, that is, an angle between the y axis in the object coordinate system and the XOY plane is calculated. The angle is the foregoing second deflection angle, and the roll angle is an angle obtained by reversing the second deflection angle.

Optionally, the second deflection angle is a deflection angle between the normal direction and the XOY plane of the ground coordinate system, that is, a deflection angle determined according to the NormalVector.Y and the NormalVector.Z, and the roll angle is an angle obtained by reversing the second deflection angle.

Optionally, the roll angle may be obtained according to the following code:

float roll=FMath::*A* tan 2(NormalVector.*Y*,NormalVector.*Z*)*-1.*f*, where FMath::A tan 2 is to invoke a static method A tan 2 in FMath class, float is a floating point number, and "*-1.f" is used for reversing an obtained first deflection angle and reserving the floating point number.

Optionally, after the pitch angle and the roll angle of the virtual object are obtained, the virtual object is rotated by using the pitch angle and the roll angle, that is, an initial pitch angle of the virtual object is increased or decreased with reference to the pitch angle and an initial roll angle of the virtual object is increased or decreased with reference to the roll angle, and the rotated virtual object hugs the ground in a ground-hugging posture.

Optionally, the virtual object may be rotated according to the pitch angle and the roll angle according to the following code:

*F*Rotator characterRotation=*F*Rotator(Pitch,0.0*f*, Roll), where FRotator is used for indicating one rotation manner, characterRotation is used for indicating a rotation angle of the virtual object, and 0.0 f is used for indicating that the virtual object does not need to be rotated according to the yaw angle.

Based on the above, according to the posture determining method for a virtual object in a virtual environment provided in this embodiment, a plane is formed by selecting three ground-hugging points, and a ground-hugging posture of the virtual object is determined according to the normal direction of the plane. The virtual object hugs the ground in a direction parallel to the plane, so that a case that most regions of the body of the character in the ground-hugging posture are hung in the air is reduced, and a pitch angle and a roll angle obtained through calculation are more consistent with an actual physical law.

The posture determining method for a virtual object in a virtual environment according to any one of FIG. 1 to FIG. 16 may be further applied to a server connected to an electronic device through a communications network, and a main body for performing the posture determining method for a virtual object in a virtual environment is not limited in this application.

Figure 18:
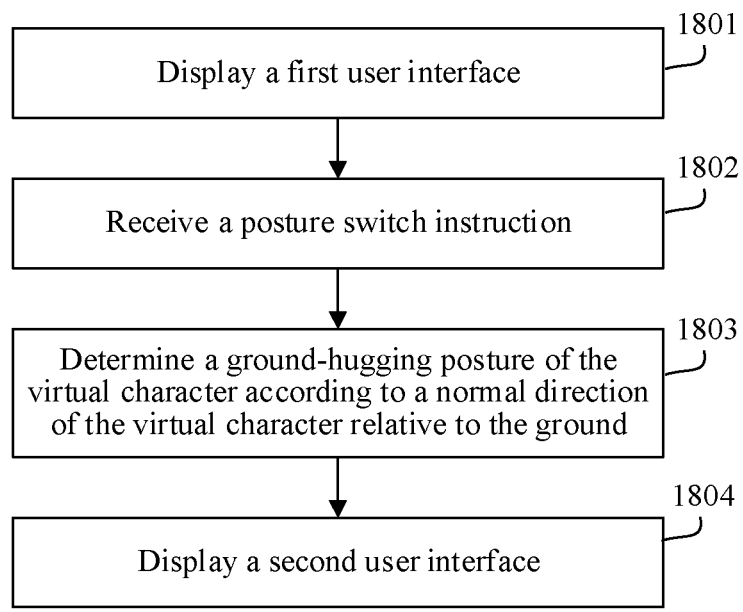
FIG. 18 is a flowchart of a posture determining method for a virtual object in a virtual environment according to another exemplary embodiment of this application.

FIG. 18 is a flowchart of a posture determining method for a virtual character in a virtual environment according to another exemplary embodiment of this application. Description is made by using an example in which the posture determining method for the virtual character is applied to an electronic device. As shown in FIG. 18, the posture determining method includes:

Step 1801: Display a first user interface.

The first user interface includes a virtual character in a standing posture on the ground of the virtual environment.

Step 1802: Receive a posture switch instruction.

The posture switch instruction is used for instructing the virtual character to switch from the standing posture to a ground-hugging posture.

Step 1803: Determine a ground-hugging posture of the virtual character according to a normal direction of the virtual character relative to the ground.

Optionally, after receiving the posture switch instruction, the electronic device determines at least one sampling point of the virtual character, and determines a normal direction of the virtual character relative to the ground according to the at least one sampling point and the ground.

The determining a normal direction of the virtual character relative to the ground according to the at least one sampling point and the ground further includes:

first performing collision detection according to the at least one sampling point to obtain a ground-hugging point, and determining a normal direction of the virtual character relative to the ground according to the ground-hugging point.

The determining a normal direction may be further divided into three situations:

First, one sampling point of the virtual character is determined, and a normal direction of the virtual character relative to the ground is determined according to the one sampling point and the ground.

Optionally, the central point of the virtual character may be determined as the sampling point, and collision detection is performed by using the sampling point, to obtain a ground-hugging point. A normal direction of the virtual character relative to the ground is determined according to a first vertical line starting from the ground-hugging point and perpendicular to the ground, and for corresponding technical details, reference may be made to the embodiment shown in FIG. 7.

Second, two sampling points of the virtual character are determined, and a normal direction of the virtual character relative to the ground is determined according to the two sampling points and the ground.

An upper-body sampling point and a lower-body sampling point of the virtual character are determined, the upper-body sampling point is a point used for representing an upper half of the virtual character in a ground-hugging posture, and the lower-body sampling point is a point used for representing a lower half of the virtual character in a ground-hugging posture. Collision detection is performed according to the upper-body sampling point and the lower-body sampling point, to obtain a first ground-hugging point and a second ground-hugging point. A connecting line between the first ground-hugging point and the second ground-hugging point is determined, and a second vertical line perpendicular to the connecting line and of which the roll angle is 0 is determined as a normal direction of the virtual character relative to the ground, and for corresponding technical details, reference may be made to the embodiment shown in FIG. 12.

Third, three sampling points of the virtual character are determined, and a normal direction of the virtual character relative to the ground is determined according to the three sampling points and the ground.

A front sampling point, a rear sampling point, and a side sampling point of the virtual character are determined, the front sampling point is a point used for representing an upper half of the virtual character in a ground-hugging posture, the rear sampling point is a point used for representing a lower half of the virtual character in a ground-hugging posture, and the side sampling point is a point used for representing a left side or a right side of the virtual character in a ground-hugging posture. Collision detection is performed according to the front sampling point, the rear sampling point, and the side sampling point, to obtain a first ground-hugging point, a second ground-hugging point, and a third ground-hugging point. A plane formed by the first ground-hugging point, the second ground-hugging point, and the third ground-hugging point is determined, and a third vertical line perpendicular to the plane is determined as a normal direction of the virtual character relative to the ground, and for corresponding technical details, reference may be made to the embodiment shown in FIG. 14.

Step 1804: Display a second user interface.

Optionally, the second user interface includes a virtual character in a ground-hugging posture on the ground of the virtual environment.

Optionally, the second user interface includes a virtual character in the ground-hugging posture on the ground of the virtual environment, the ground includes a first ground region and a second ground region forming an angle, the head of the virtual character is hung in the air in the first ground region, the feet of the virtual character are hung in the air in the second ground region, and the waist of the virtual character is embedded into the ground at a junction of the first ground region and the second ground region.

Figure 19:
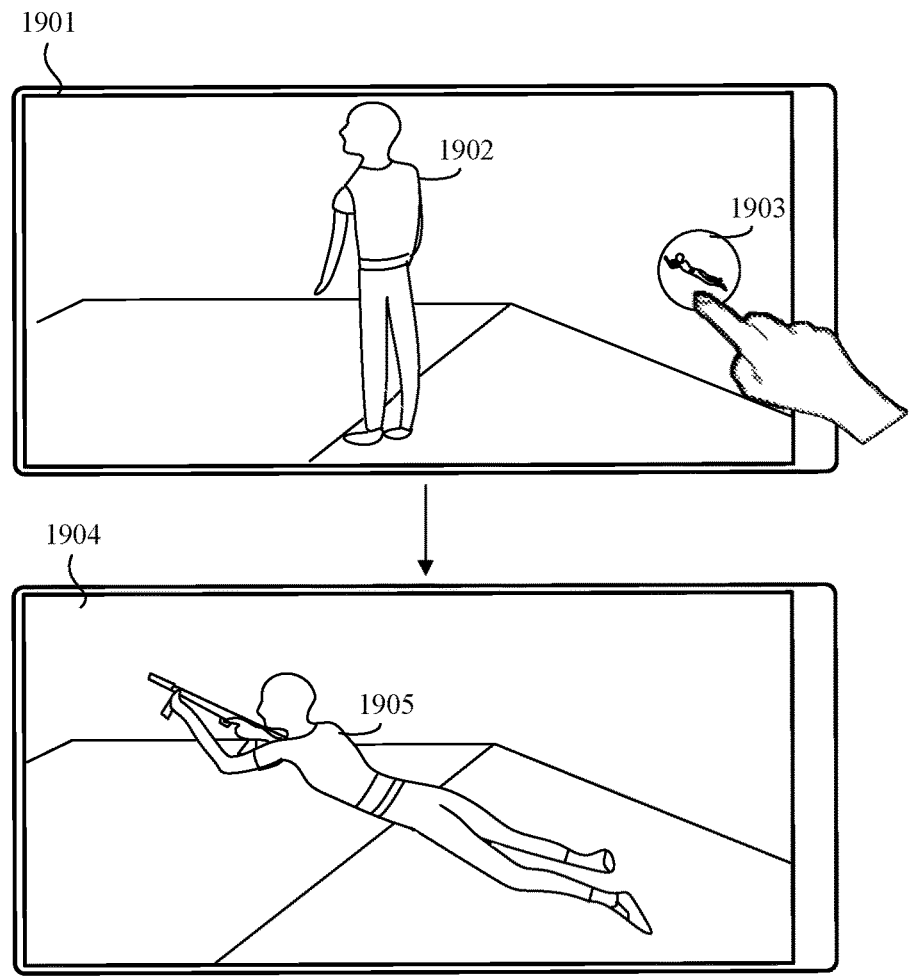
FIG. 19 is a schematic diagram of a user interface according to another exemplary embodiment of this application.

Exemplarily, referring to FIG. 19, first, the electronic device displays a first user interface 1901, and a virtual character 1902 in a standing posture on the ground of the virtual environment is included in the first user interface. After the user touches a posture switch button 1903, the electronic device receives a posture switch instruction, and determines a ground-hugging posture of the virtual character according to a normal direction of the virtual character relative to the ground. The electronic device displays a second user interface 1904, and the second user interface includes a virtual character 1905 in a ground-hugging posture on the ground of the virtual environment.

Figure 20:
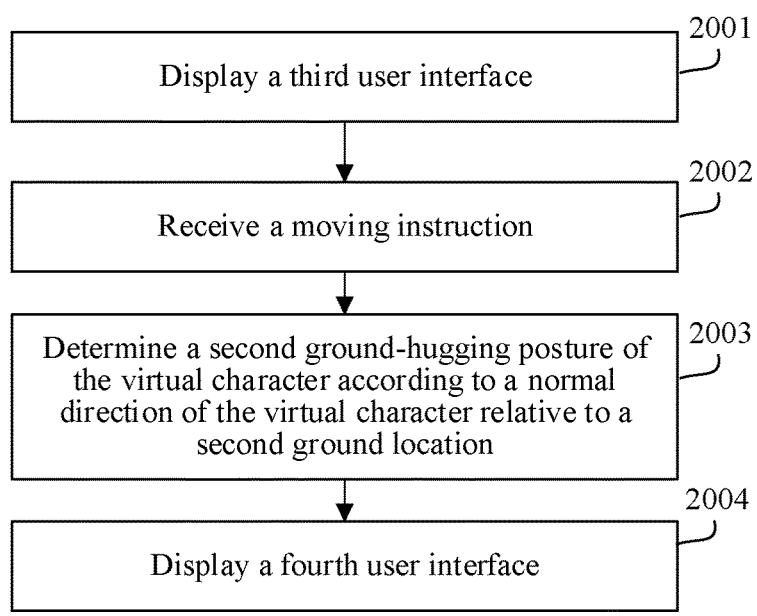
FIG. 20 is a flowchart of a posture determining method for a virtual object in a virtual environment according to another exemplary embodiment of this application.

FIG. 20 is a flowchart of a posture determining method for a virtual character in a virtual environment according to another exemplary embodiment of this application. Description is made by using an example in which the posture determining method for the virtual character is applied to an electronic device. As shown in FIG. 20, the posture determining method includes:

Step 2001: Display a third user interface.

The third user interface includes a virtual character in a first ground-hugging posture at a first ground location of the virtual environment.

Step 2002: Receive a moving instruction.

The moving instruction is used for instructing the virtual character to move from the first ground location.

Step 2003: Determine a second ground-hugging posture of the virtual character according to a normal direction of the virtual character relative to a second ground location.

Optionally, after receiving the moving instruction, the electronic device determines at least one sampling point of the virtual character according to a central point of the virtual character, and determines a normal direction of the virtual character relative to a second ground location according to the at least one sampling point and the second ground location.

The determining a normal direction of the virtual character relative to the second ground location according to the at least one sampling point and the second ground location further includes:

first performing collision detection according to the at least one sampling point to obtain a ground-hugging point, and determining a normal direction of the virtual character relative to the second ground location according to the ground-hugging point.

The determining a normal direction may be further divided into three situations:

The determining a normal direction may be further divided into three situations:

First, one sampling point of the virtual character is determined, and a normal direction of the virtual character relative to the ground is determined according to the one sampling point and the ground.

Optionally, the central point of the virtual character may be determined as the sampling point, and collision detection is performed by using the sampling point, to obtain a ground-hugging point. A normal direction of the virtual character relative to the ground is determined according to a first vertical line starting from the ground-hugging point and perpendicular to the ground, and for corresponding technical details, reference may be made to the embodiment shown in FIG. 7.

Second, two sampling points of the virtual character are determined, and a normal direction of the virtual character relative to the ground is determined according to the two sampling points and the ground.

An upper-body sampling point and a lower-body sampling point of the virtual character are determined, the upper-body sampling point is a point used for representing an upper half of the virtual character in a ground-hugging posture, and the lower-body sampling point is a point used for representing a lower half of the virtual character in a ground-hugging posture. Collision detection is performed according to the upper-body sampling point and the lower-body sampling point, to obtain a first ground-hugging point and a second ground-hugging point. A connecting line between the first ground-hugging point and the second ground-hugging point is determined, and a second vertical line perpendicular to the connecting line and of which the roll angle is 0 is determined as a normal direction of the virtual character relative to the ground, and for corresponding technical details, reference may be made to the embodiment shown in FIG. 12.

Third, three sampling points of the virtual character are determined, and a normal direction of the virtual character relative to the ground is determined according to the three sampling points and the ground.

A front sampling point, a rear sampling point, and a side sampling point of the virtual character are determined, the front sampling point is a point used for representing an upper half of the virtual character in a ground-hugging posture, the rear sampling point is a point used for representing a lower half of the virtual character in a ground-hugging posture, and the side sampling point is a point used for representing a left side or a right side of the virtual character in a ground-hugging posture. Collision detection is performed according to the front sampling point, the rear sampling point, and the side sampling point, to obtain a first ground-hugging point, a second ground-hugging point, and a third ground-hugging point. A plane formed by the first ground-hugging point, the second ground-hugging point, and the third ground-hugging point is determined, and a third vertical line perpendicular to the plane is determined as a normal direction of the virtual character relative to the ground, and for corresponding technical details, reference may be made to the embodiment shown in FIG. 16.

Step 2004: Display a fourth user interface.

The fourth user interface includes a virtual character in a second ground-hugging posture at a second ground location of the virtual environment.

Optionally, the second user interface includes a virtual character in a ground-hugging posture on the ground of the virtual environment, the ground includes a first ground region and a second ground region forming an angle, the head of the virtual character is hung in the air in the first ground region, the feet of the virtual character are hung in the air in the second ground region, and the waist of the virtual character is embedded into the ground at a junction of the first ground region and the second ground region.

Figure 21:
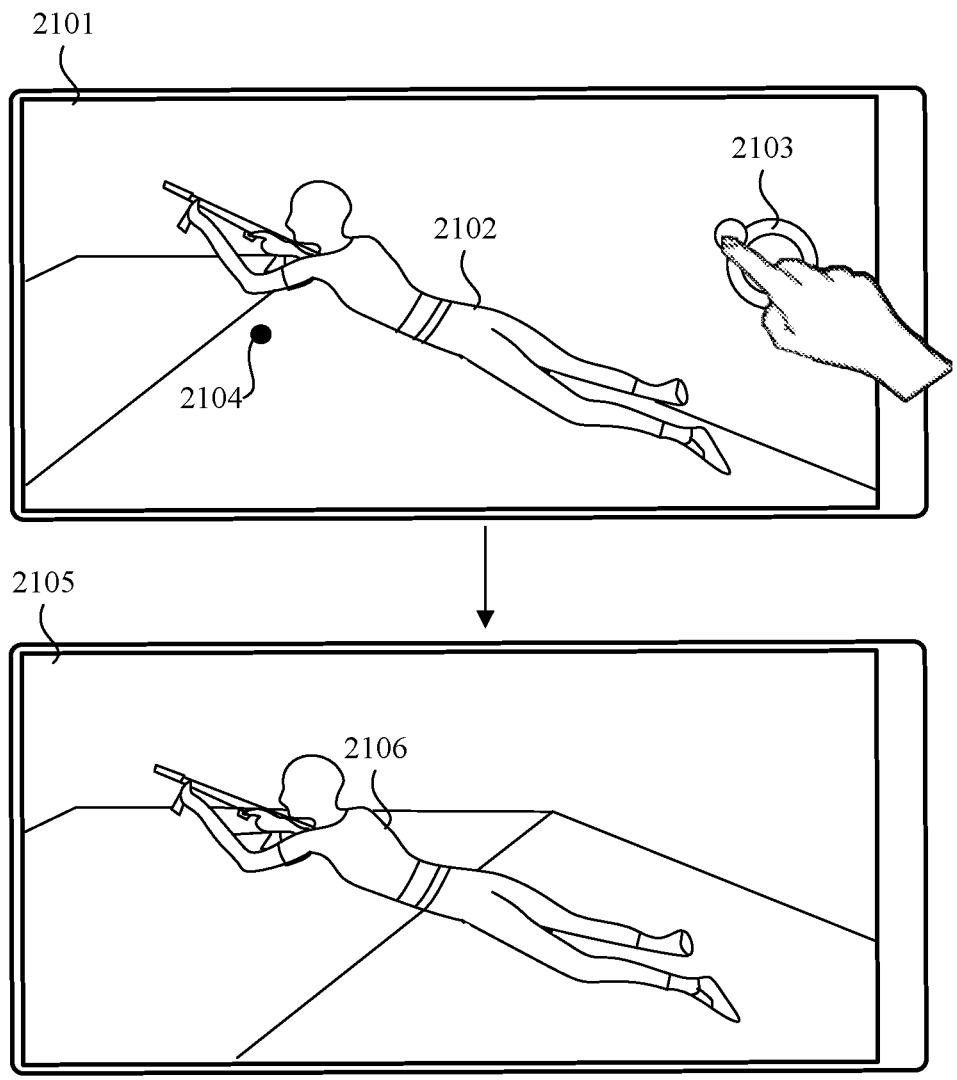
FIG. 21 is a schematic diagram of a user interface according to another exemplary embodiment of this application.

Exemplarily, referring to FIG. 21, first, the electronic device displays a third user interface 2101, and a virtual object 2102 in a first ground-hugging posture at a first ground location of the virtual environment is included in the third user interface. After the user touches a moving button 2103, the electronic device receives a moving instruction, and determines a ground-hugging posture of the virtual object according to a normal direction of the virtual object relative to a second ground location 2104. The electronic device displays a fourth user interface 2105, and the fourth user interface includes a virtual object 2106 in a second ground-hugging posture at a second ground location of the virtual environment.

Figure 22:
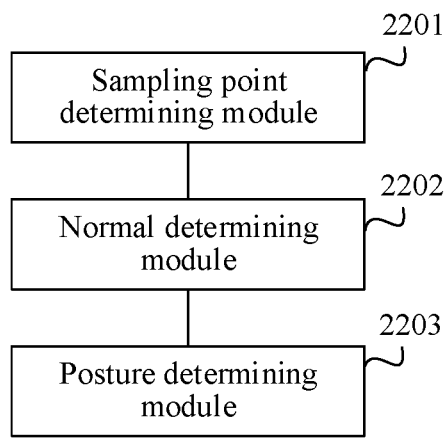
FIG. 22 is a structural block diagram of a posture determining apparatus for a virtual object in a virtual environment according to an exemplary embodiment of this application.

FIG. 22 is a structural block diagram of a posture determining apparatus for a virtual object in a virtual environment according to an exemplary embodiment of this application. The apparatus includes a sampling point determining module 2201, a normal determining module 2202, and a posture determining module 2203, where the sampling point determining module 2201 is configured to determine at least one sampling point of the virtual object, the sampling point being a point used for performing collision detection relative to the ground;

the normal determining module 2202 is configured to determine a normal direction of the virtual object relative to the ground according to the at least one sampling point and the ground on which the virtual object is located; and the posture determining module 2203 is configured to determine a ground-hugging posture of the virtual object in the virtual environment according to the normal direction.

Figure 23:
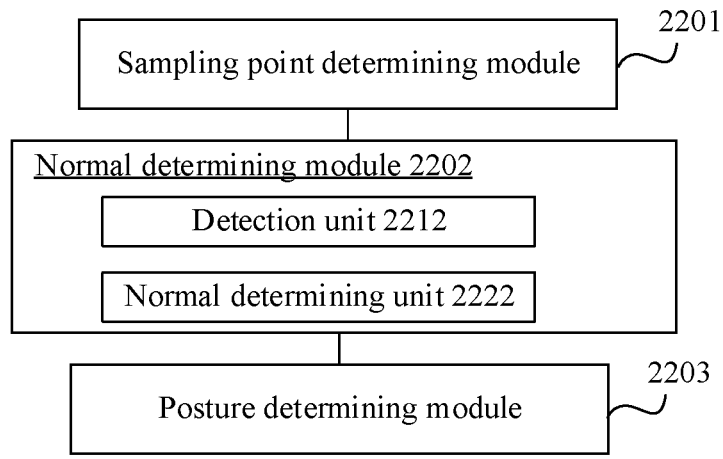
FIG. 23 is a structural block diagram of a posture determining apparatus for a virtual character in a virtual environment according to another exemplary embodiment of this application.

In an optional embodiment, as shown in FIG. 23, the normal determining module 2202 includes:

a detection unit 2212, configured to perform collision detection along a vertically downward direction from the sampling point, and determine a collision point between the virtual object and the ground during collision as a ground-hugging point; and a normal determining unit 2222, configured to determine a normal direction of the virtual object relative to the ground according to the ground-hugging point.

In an optional embodiment, the sampling point includes a central point of the virtual object, and the ground-hugging point is a point obtained by performing collision detection from the central point; and the normal determining unit 2222 is further configured to determine the normal direction of the virtual object relative to the ground according to a first vertical line starting from the ground-hugging point and perpendicular to the ground.

In an optional embodiment, the sampling point determining module 2201 is further configured to determine a central point of a virtual object as a sampling point of the virtual object.

In an optional embodiment, the sampling point determining module 2201 includes:

a deflection angle determining unit 2211, configured to determine a pitch angle of the virtual object in the virtual environment according to a first deflection angle of the normal direction relative to an x axis of a ground coordinate system; and the deflection angle determining unit 2211 being further configured to determine a roll angle of the virtual object in the virtual environment according to a second deflection angle of the normal direction relative to a z axis of the ground coordinate system, the ground coordinate system being a coordinate system of a world in which the virtual environment is located.

In an optional embodiment, the sampling point includes a front sampling point and a rear sampling point, the front sampling point is a point used for representing an upper half of the virtual object under a ground-hugging posture, and the rear sampling point is a point used for representing a lower half of the virtual object under a ground-hugging posture;

the normal determining unit 2222 is further configured to determine a connecting line between a first ground-hugging point and a second ground-hugging point, the first ground-hugging point being a point obtained by performing collision detection from the front sampling point, and the second ground-hugging point being a point obtained by performing collision detection from the rear sampling point; and the normal determining unit 2222 is further configured to determine the normal direction of the virtual object relative to the ground according to a second vertical line perpendicular to the connecting line and of which a roll angle is 0.

In an optional embodiment, the sampling point determining module 2201 is further configured to determine a point located at a first distance from and in front of the central point of the virtual object as the front sampling point;

the sampling point determining module 2201 is further configured to determine a point located at a second distance from and in rear of the central point of the virtual object as the rear sampling point; and the sampling point determining module 2201 is further configured to determine the front sampling point and the rear sampling point as sampling points of the virtual object.

In an optional embodiment, the posture determining module 2203 is further configured to determine a pitch angle of the virtual object in the virtual environment according to a first deflection angle of the normal direction relative to an x axis of a ground coordinate system, the ground coordinate system being a coordinate system of a world in which the virtual environment is located.

In an optional embodiment, the sampling point includes a front sampling point, a rear sampling point, and a side sampling point. The front sampling point is a point used for representing an upper half of the virtual object under the ground-hugging posture, the rear sampling point is a point used for representing a lower half of the virtual object under the ground-hugging posture, and the side sampling point is a point used for representing a left side or a right side of the virtual object under the ground-hugging posture;

the normal determining unit 2222 is further configured to determine a plane on which a first ground-hugging point, a second ground-hugging point, and a third ground-hugging point are located, the first ground-hugging point being a point obtained by performing collision detection from the front sampling point, the second ground-hugging point being a point obtained by performing collision detection from the rear sampling point, and the third ground-hugging point being a point obtained by performing collision detection from the side sampling point; and the normal determining unit 2222 is further configured to determine the normal direction of the virtual object relative to the ground according to a third vertical line upward perpendicular to the plane.

In an optional embodiment, the sampling point determining module 2201 is further configured to determine a point located at a first distance from and in front of the central point of the virtual object as the front sampling point;

the sampling point determining module 2201 is further configured to determine a point located at a second distance from and in rear of the central point of the virtual object as the rear sampling point; and the sampling point determining module 2201 is further configured to determine a point located at a third distance from and on the left of the central point of the virtual object or a point located at a fourth distance from and on the right of the central point of the virtual object as the side sampling point; and the sampling point determining module 2201 is further configured to determine the front sampling point, the rear sampling point, and the side sampling point as sampling points of the virtual object.

In an optional embodiment, the posture determining module 2203 is further configured to determine a pitch angle of the virtual object in the virtual environment according to a first deflection angle of the normal direction relative to an x axis of a ground coordinate system, the posture determining module 2203 is further configured to determine a roll angle of the virtual object in the virtual environment according to a second deflection angle of the normal direction relative to a z axis of a ground coordinate system, the ground coordinate system being a coordinate system of a world in which the virtual environment is located.

In an optional embodiment, the ground includes at least one of a region having a gradient, a cambered region, a sunken region, and a protruding region.

Figure 24:
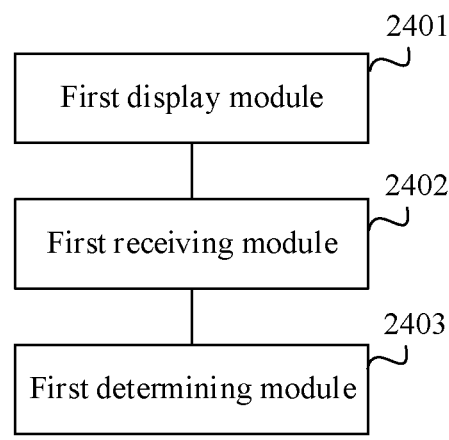
FIG. 24 is a structural block diagram of a posture determining apparatus for a virtual character in a virtual environment according to another exemplary embodiment of this application.

FIG. 24 is a structural block diagram of a posture determining apparatus for a virtual character in a virtual environment according to another exemplary embodiment of this application. The apparatus includes a first display module 2401, a first receiving module 2402, and a first determining module 2403, where the first display module 2401 is configured to display a first user interface, the first user interface including a virtual character in a standing posture on the ground of the virtual environment;

the first receiving module 2402 is configured to receive a posture switch instruction, the posture switch instruction being used for instructing the virtual character to switch from the standing posture to a ground-hugging posture;

the first determining module 2403 is configured to determine the ground-hugging posture of the virtual character according to a normal direction of the virtual character relative to the ground; and the first display module 2401 is further configured to display a second user interface, the second user interface including a virtual character in the ground-hugging posture on the ground of the virtual environment.

In an optional embodiment, the first determining module 2403 is further configured to determine, after the posture switch instruction is received, at least one sampling point of the virtual character according to a central point of the virtual character, the sampling point being a point used for performing collision detection relative to the ground; and the first determining module 2403 is further configured to determine a normal direction of the virtual character relative to the ground according to the at least one sampling point and the ground.

Figure 25:
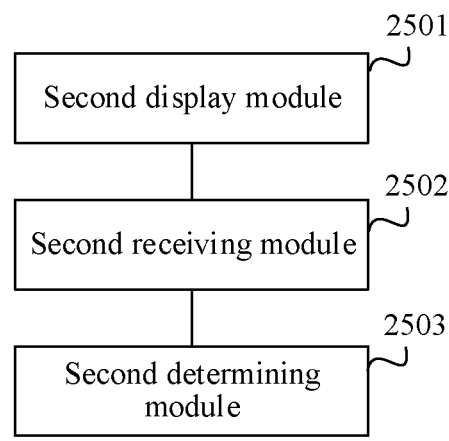
FIG. 25 is a structural block diagram of a posture determining apparatus for a virtual character in a virtual environment according to another exemplary embodiment of this application.

FIG. 25 is a structural block diagram of a posture determining apparatus for a virtual character in a virtual environment according to another exemplary embodiment of this application. The apparatus includes a second display module 2501, a second receiving module 2502, and a second determining module 2503, where the second display module 2501 is configured to display a third user interface, the third user interface including a virtual character in a first ground-hugging posture at a first ground location of the virtual environment;

the second receiving module 2502 is configured to receive a moving instruction, the moving instruction being used for instructing the virtual character to move from the first ground location;

the second determining module 2503 is configured to determine a second ground-hugging posture of the virtual character according to a normal direction of the virtual character relative to a second ground location; and the second display module 2501 is further configured to display a fourth user interface, the fourth user interface including the virtual character in the second ground-hugging posture at the second ground location of the virtual environment.

In an optional embodiment, the second determining module 2503 is further configured to determine, after the moving instruction is received, at least one sampling point of the virtual character according to a central point of the virtual character, the sampling point being a point used for performing collision detection relative to the ground; and the second determining module 2503 is further configured to determine a normal direction of the virtual character relative to the second ground location according to the at least one sampling point and the second ground location.

Figure 26:
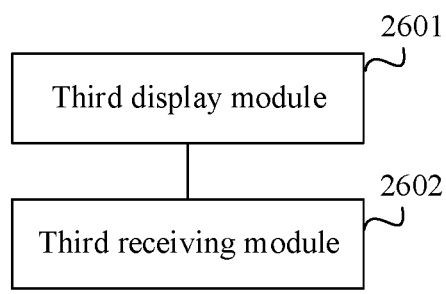
FIG. 26 is a structural block diagram of a posture determining apparatus for a virtual character in a virtual environment according to another exemplary embodiment of this application.

FIG. 26 is a structural block diagram of a posture determining apparatus for a virtual character in a virtual environment according to another exemplary embodiment of this application. The apparatus includes a third display module 2601 and a third receiving module 2602, where the third display module 2601 is configured to display a first user interface, the first user interface including a virtual character in a standing posture on the ground of the virtual environment;

the third receiving module 2602 is configured to receive a posture switch instruction, the posture switch instruction being used for instructing the virtual character to switch from the standing posture to a ground-hugging posture; and the third display module 2601 is further configured to display a second user interface, the second user interface including a virtual character in the ground-hugging posture on the ground of the virtual environment, the ground including a first ground region and a second ground region forming an angle, the head of the virtual character being hung in the air in the first ground region, the feet of the virtual character being hung in the air in the second ground region, and the waist of the virtual character being embedded into the ground at a junction of the first ground region and the second ground region.

Figure 27:
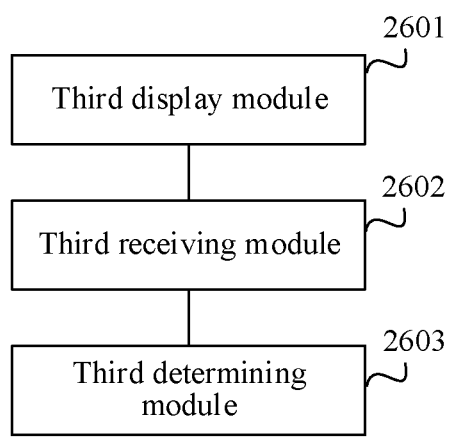
FIG. 27 is a structural block diagram of a posture determining apparatus for a virtual character in a virtual environment according to another exemplary embodiment of this application.

In an optional embodiment, as shown in FIG. 27, the apparatus further includes:

a third determining module 2603, configured to determine an upper-body sampling point and a lower-body sampling point of the virtual character according to a central point of the virtual character; and the third determining module 2603 being further configured to determine a connecting line between a first ground-hugging point and a second ground-hugging point, the first ground-hugging point being a point located in the first ground region and obtained by performing collision detection from the upper-body sampling point, and the second ground-hugging point being a point located in the second ground region and obtained by performing collision detection from the lower-body sampling point.

Figure 28:
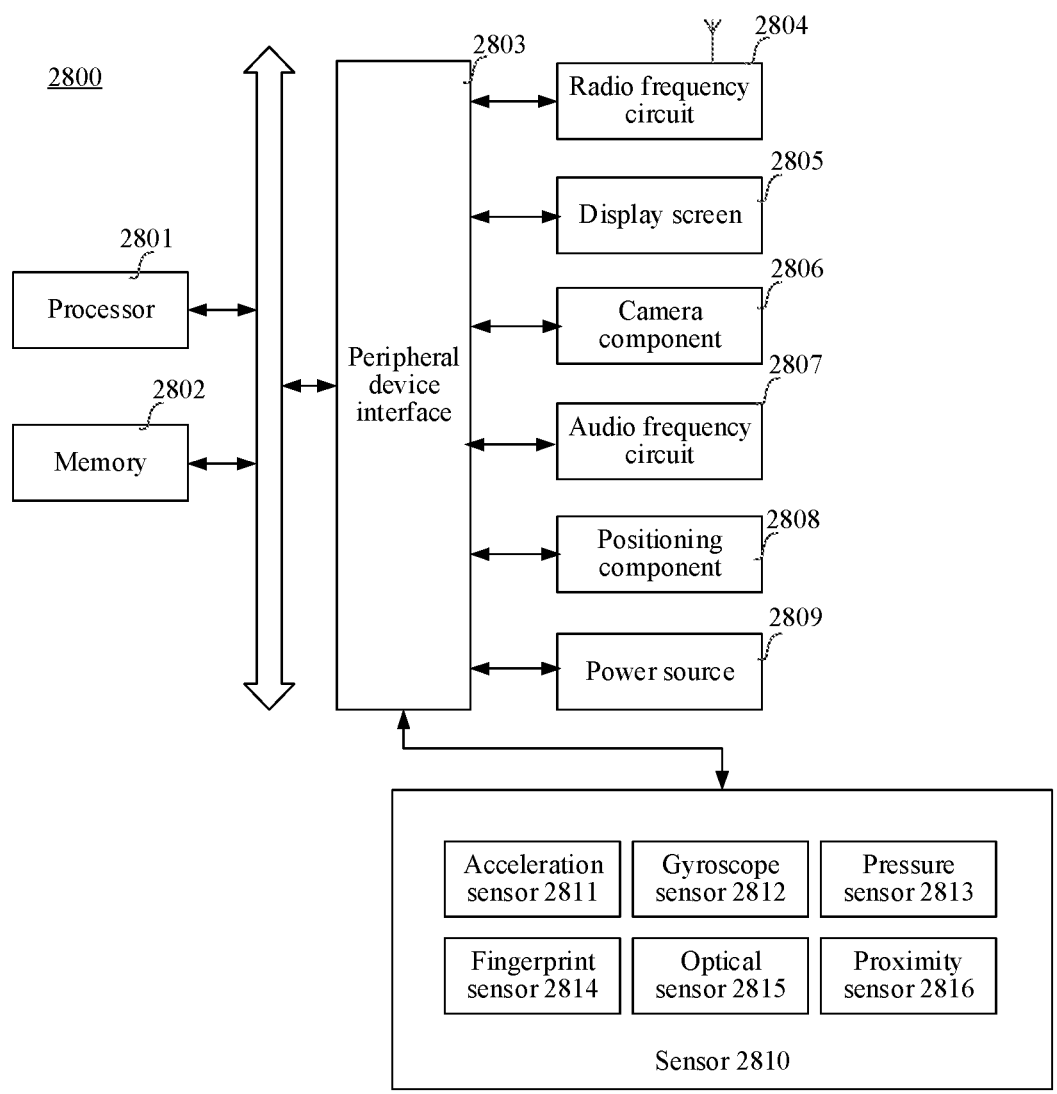
FIG. 28 is a structural block diagram of an electronic device according to an exemplary embodiment of this application.

FIG. 28 shows a structural block diagram of an electronic device 2800 according to an exemplary embodiment of this application. The electronic device 2800 may be a smartphone, a tablet computer, an MP3 player, an MP4 player, a notebook computer, or a desktop computer. The electronic device 2800 may also be referred to as other names such as user equipment, a portable electronic device, a laptop electronic device, and a desktop electronic device.

Generally, the electronic device 2800 includes a processor 2801 and a memory 2802.

The processor 2801 may include one or more processing cores, for example, a 4-core processor or an 8-core processor. The processor 2801 may be implemented in at least one hardware form of digital signal processing (DSP), a field-programmable gate array (FPGA), and a programmable logic array (PLA). The processor 2801 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 2801 may be integrated with a graphics processing unit (GPU). The GPU is configured to be responsible for rendering and drawing content that a display screen needs to display. In some embodiments, the processor 2801 may further include an artificial intelligence (AI) processor. The AI processor is configured to process a computing operation related to machine learning.

The memory 2802 may include one or more computer-readable storage media. The computer-readable storage medium may be non-transient. The memory 2802 may further include a high-speed random access memory and a non-volatile memory, for example, one or more disk storage devices, or flash memory devices. In some embodiments, the non-transient computer-readable storage medium in the memory 2802 is configured to store at least one instruction, and the at least one instruction is configured to be executed by the processor 2801 to implement the posture determining method for a virtual object in a virtual environment provided in the method embodiments of this application.

In some embodiments, the electronic device 2800 may optionally include: a peripheral device interface 2803 and at least one peripheral device. The processor 2801, the memory 2802, and the peripheral device interface 2803 may be connected to each other through buses or signal lines. The peripheral devices may be connected to the peripheral device interface 2803 through buses, signal lines, or circuit boards. Specifically, the peripheral device includes: at least one of a radio frequency (RF) circuit 2804, a touch display screen 2805, a camera component 2806, an audio frequency circuit 2807, a positioning component 2808, and a power source 2809.

The peripheral device interface 2803 may be configured to connect the at least one peripheral device related to input/output (I/O) to the processor 2801 and the memory 2802. In some embodiments, the processor 2801, the memory 2802 and the peripheral device interface 2803 are integrated on a same chip or circuit board. In some other embodiments, any one or two of the processor 2801, the memory 2802, and the peripheral device interface 2803 may be implemented on a single chip or circuit board. This is not limited in this embodiment.

The RF circuit 2804 is configured to receive and transmit an RF signal, which is also referred to as an electromagnetic signal. The RF circuit 2804 communicates with a communications network and other communications devices by using the electromagnetic signal. The RF circuit 2804 converts an electrical signal into an electromagnetic signal to be transmitted, or converts a received electromagnetic signal into an electrical signal. Optionally, the RF circuit 2804 includes: an antenna system, an RF transceiver, one or more amplifiers, a tuner, an oscillator, a digital signal processor, a codec chipset, a subscriber identity module card, and the like. The RF circuit 2804 may communicate with other electronic devices through at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 2804 may also include a circuit related to near field communication (NFC). This is not limited in this application.

The display screen 2805 is configured to display a user interface (UI). The UI may include a graphic, a text, an icon, a video, and any combination thereof. In a case that the display screen 2805 is a touch display screen, the display screen 2805 also has a capability of collecting a touch signal on or above a surface of the display screen 2805. The touch signal may be used as a control signal and input into the processor 2801 for processing. In this case, the display screen 2805 may be further configured to provide a virtual button and/or a virtual keyboard, which is also referred to as a soft button and/or a soft keyboard. In some embodiments, there may be one display screen 2805, disposed on a front panel of the electronic device 2800. In some other embodiments, there may be at least two display screens 2805, disposed on different surfaces of the electronic device 2800 respectively or in a folded design. In some more embodiments, the display screen 2805 may be a flexible display screen, disposed on a curved surface or a folded surface of the electronic device 2800. Even, the display screen 2805 may be further set in a non-rectangular irregular pattern, namely, a special-shaped screen. The display screen 2805 may be made of a material such as a liquid crystal display (LCD) or an organic light-emitting diode (OLED).

The camera component 2806 is configured to collect an image or a video. Optionally, the camera component 2806 includes a front-facing camera and a rear-facing camera. Generally, the front-facing camera is disposed in the front panel of the electronic device, and the rear-facing camera is disposed in the rear of the electronic device. In some embodiments, there are at least two rear-facing cameras, each of which is any one of a main camera, a depth of field camera, a wide-angle camera and a long-focal-length camera, so as to implement a background blurring function by fusing the main camera and the depth of field camera, and panoramic shooting, virtual reality (VR) shooting functions, or other fused shooting functions by fusing the main camera and the wide-angle camera. In some embodiments, the camera component 2806 may further include a flash. The flash may be a monochrome temperature flash, or may be a double color temperature flash. The double color temperature flash refers to a combination of a warm light flash and a cold light flash, and may be used for light compensation under different color temperatures.

The audio frequency circuit 2807 may include a microphone and a speaker. The microphone is configured to collect a sound wave of a user and an environment, and convert the sound wave into the electrical signal to be input to the processor 2801 for processing, or to be input to the RF circuit 2804 for implementing voice communication. For the purpose of stereo collection or noise reduction, there may be a plurality of microphones, disposed at different portions of the electronic device 2800 respectively. The microphone may be further an array microphone or an omni-directional collection type microphone. The speaker is configured to convert the electrical signal from the processor 2801 or the RF circuit 2804 into the sound wave. The speaker may be a conventional film speaker, or may be a piezoelectric ceramic speaker. In a case that the speaker is the piezoelectric ceramic speaker, not only can the electrical signal be converted into a sound wave audible to a human being, but also the electrical signal can be converted into a sound wave inaudible to the human being for ranging and the like. In some embodiments, the audio frequency circuit 2807 may alternatively include an earphone jack.

The positioning component 2808 is configured to position a current geographic location of the electronic device 2800 to implement navigation or a location based service (LBS). The positioning component 2808 may be a positioning component based on a global positioning system (GPS) of the United States, a Beidou system of China, or a Galileo system of Russia.

The power source 2809 is configured to supply power for various components in the electronic device 2800. The power source 2809 may be an alternating current, a direct current, a disposable battery, or a rechargeable battery. In a case that the power source 2809 includes the rechargeable battery, the rechargeable battery may be a wired rechargeable battery or a wireless rechargeable battery. The wired rechargeable battery is a battery charged through a wired line. The wireless rechargeable battery is a battery charged through a wireless coil. The rechargeable battery may be further configured to support a fast charge technology.

In some embodiments, the electronic device 2800 further includes one or more sensors 2810. The one or more sensors 2810 include but are not limited to: an acceleration sensor 2811, a gyroscope sensor 2812, a pressure sensor 2813, a fingerprint sensor 2814, an optical sensor 2815, and a proximity sensor 2816.

The acceleration sensor 2811 may detect the magnitude of acceleration on three coordinate axes of a coordinate system established with the electronic device 2800. For example, the acceleration sensor 2811 may be configured to detect components of gravity acceleration on the three coordinate axes. The processor 2801 may control, according to a gravity acceleration signal collected by the acceleration sensor 2811, the touch display screen 2805 to display the user interface in a transverse view or a longitudinal view. The acceleration sensor 2811 may be further configured to collect motion data of a game or a user.

The gyroscope sensor 2812 may detect a body direction and a rotation angle of the electronic device 2800. The gyroscope sensor 2812 may cooperate with the acceleration sensor 2811 to collect a 3D action by the user on the electronic device 2800. The processor 2801 may implement the following functions according to the data collected by the gyroscope sensor 2812: motion sensing (such as changing the UI according to a tilt operation of the user), image stabilization at shooting, game control, and inertial navigation.

The pressure sensor 2813 may be disposed at a side frame of the electronic device 2800 and/or a lower layer of the touch display screen 2805. In a case that the pressure sensor 2813 is disposed at the side frame of the electronic device 2800, a holding signal of the user on the electronic device 2800 may be detected, and left/right hand identification or a quick action may be performed by the processor 2801 according to the holding signal collected by the pressure sensor 2813. In a case that the pressure sensor 2813 is disposed at the lower layer of the touch display screen 2805, an operable control on the UI interface is controlled by the processor 2801 according to a pressure operation of the user on the touch display screen 2805. The operable control includes at least one of a button control, a scroll-bar control, an icon control and a menu control.

The fingerprint sensor 2814 is configured to collect a user's fingerprint, and the processor 2801 identifies a user's identity according to the fingerprint collected by the fingerprint sensor 2814, or the fingerprint sensor 2814 identifies a user's identity according to the collected fingerprint. In a case that identifying that the user's identity is a trusted identity, the processor 2801 authorizes the user to perform related sensitive operations. The sensitive operations include: unlocking a screen, viewing encryption information, downloading software, paying, changing a setting, and the like. The fingerprint sensor 2814 may be disposed on a front surface, a back surface, or a side surface of the electronic device 2800. In a case that a physical button or a vendor logo is disposed on the electronic device 2800, the fingerprint sensor 2814 may be integrated with the physical button or the vendor logo.

The optical sensor 2815 is configured to collect ambient light intensity. In an embodiment, the processor 2801 may control display brightness of the touch display screen 2805 according to the ambient light intensity collected by the optical sensor 2815. Specifically, in a case that the ambient light intensity is relatively high, the display brightness of the touch display screen 2805 is turned up. In a case that the ambient light intensity is relatively low, the display brightness of the touch display screen 2805 is turned down. In another embodiment, the processor 2801 may further dynamically adjust a shooting parameter of the camera component 2806 according to the ambient light intensity collected by the optical sensor 2815.

The proximity sensor 2816, also referred to as a distance sensor, is generally disposed on the front panel of the electronic device 2800. The proximity sensor 2816 is configured to collect a distance between the user and the front surface of the electronic device 2800. In an embodiment, in a case that the proximity sensor 2816 detects that the distance between the user and the front surface of the electronic device 2800 gradually becomes smaller, the touch display screen 2805 is controlled by the processor 2801 to switch from a screen-on state to a screen-off state. In a case that the proximity sensor 2816 detects that the distance between the user and the front surface of the electronic device 2800 gradually becomes larger, the touch display screen 2805 is controlled by the processor 2801 to switch from the screen-off state to the screen-on state.

A person skilled in the art may understand that a structure shown in FIG. 28 constitutes no limitation on the electronic device 2800, and the electronic device may include more or fewer components than those shown in the figure, or some components may be combined, or a different component deployment may be used.

A person of ordinary skill in the art may understand that all or some of steps of the embodiments may be implemented by hardware or a program instructing related hardware. The program may be stored in a computer-readable storage medium. The storage medium may be a read-only memory (ROM), a magnetic disk or an optical disc.

The foregoing descriptions are merely exemplary embodiments of this application, and are not intended to limit this application. Any modification, equivalent replacement, improvement and the like made within the spirit and principle of this application is to fall within the protection scope of this application.

What is claimed is:

1. A method for determining a posture of a virtual object in a virtual environment, applied to an electronic device having one or more processors and memory storing a plurality of programs to be executed by the one or more processors, the method comprising:
    determining at least one sampling point of the virtual object, the sampling point being a point used for performing collision detection relative to a ground;
    determining a normal direction of the virtual object relative to the ground at the at least one sampling point and the ground on which the virtual object is located by:
        performing collision detection along a vertically downward direction from the sampling point to the ground;
        determining a collision point between the virtual object and the ground during collision as a ground-hugging point; and
        determining the normal direction of the virtual object relative to the ground according to the ground-hugging point;
    determining a ground-hugging posture of the virtual object in the virtual environment according to the normal direction; and
    rendering the virtual object in the virtual environment according to the ground-hugging posture.

2. The method according to claim 1, wherein the sampling point comprises a central point of the virtual object; and
    the determining the normal direction of the virtual object relative to the ground according to the ground-hugging point comprises:
        determining the normal direction of the virtual object relative to the ground according to a first vertical line starting from the ground-hugging point and perpendicular to the ground.

3. The method according to claim 2, wherein the determining at least one sampling point of the virtual object comprises:
    determining the central point of the virtual object as the sampling point of the virtual object.

4. The method according to claim 2, wherein the determining a ground-hugging posture of the virtual object in the virtual environment according to the normal direction comprises:
    determining a pitch angle of the virtual object in the virtual environment according to a first deflection angle of the normal direction relative to an x axis of a ground coordinate system; and
    determining a roll angle of the virtual object in the virtual environment according to a second deflection angle of the normal direction relative to a z axis of the ground coordinate system,
    the ground coordinate system being a coordinate system of a world in which the virtual environment is located.

5. The method according to claim 1, wherein the sampling point comprises a front sampling point and a rear sampling point, the front sampling point is a point used for representing an upper half of the virtual object under the ground-hugging posture, and the rear sampling point is a point used for representing a lower half of the virtual object under the ground-hugging posture; and
    the determining the normal direction of the virtual object relative to the ground according to the ground-hugging point comprises:
        determining a connecting line between a first ground-hugging point and a second ground-hugging point, the first ground-hugging point being a point obtained by performing collision detection from the front sampling point, and the second ground-hugging point being a point obtained by performing collision detection from the rear sampling point; and
        determining the normal direction of the virtual object relative to the ground according to a second vertical line perpendicular to the connecting line and of which a roll angle is 0.

6. The method according to claim 5, wherein the determining at least one sampling point of the virtual object comprises:
    determining a point located at a first distance from and in front of the central point of the virtual object as the front sampling point;
    determining a point located at a second distance from and in rear of the central point of the virtual object as the rear sampling point; and
    determining the front sampling point and the rear sampling point as the sampling points of the virtual object.

7. The method according to claim 5, wherein the determining a ground-hugging posture of the virtual object in the virtual environment according to the normal direction comprises:
    determining a pitch angle of the virtual object in the virtual environment according to a first deflection angle of the normal direction relative to an x axis of a ground coordinate system,
    the ground coordinate system being a coordinate system of a world in which the virtual environment is located.

8. The method according to claim 1, wherein the sampling point comprises a front sampling point, a rear sampling point, and a side sampling point, the front sampling point is a point used for representing an upper half of the virtual object under the ground-hugging posture, the rear sampling point is a point used for representing a lower half of the virtual object under the ground-hugging posture, and the side sampling point is a point used for representing a left side or a right side of the virtual object under the ground-hugging posture; and the determining the normal direction of the virtual object relative to the ground according to the ground-hugging point comprises:

determining a plane on which a first ground-hugging point, a second ground-hugging point, and a third ground-hugging point are located, the first ground-hugging point being a point obtained by performing collision detection from the front sampling point, the second ground-hugging point being a point obtained by performing collision detection from the rear sampling point, and the third ground-hugging point being a point obtained by performing collision detection from the side sampling point; and determining the normal direction of the virtual object relative to the ground according to a third vertical line upward perpendicular to the plane.

9. The method according to claim 5, wherein the determining at least one sampling point of the virtual object comprises:

determining a point located at a first distance from and in front of the central point of the virtual object as the front sampling point;

determining a point located at a second distance from and in rear of the central point of the virtual object as the rear sampling point; and determining a point located at a third distance from and on the left of the central point of the virtual object or a point located at a fourth distance from and on the right of the central point of the virtual object as the side sampling point; and determining the front sampling point, the rear sampling point, and the side sampling point as the sampling points of the virtual object.

10. The method according to claim 5, wherein the determining a ground-hugging posture of the virtual object in the virtual environment according to the normal direction comprises:

determining a pitch angle of the virtual object in the virtual environment according to a first deflection angle of the normal direction relative to an x axis of a ground coordinate system, determining a roll angle of the virtual object in the virtual environment according to a second deflection angle of the normal direction relative to a z axis of the ground coordinate system, the ground coordinate system being a coordinate system of a world in which the virtual environment is located.

11. The method according to claim 1, wherein the ground comprises at least one of a region having a gradient, a cambered region, a sunken region, and a protruding region.

12. An electronic device comprising memory and one or more processors, the memory storing a plurality of computer programs that, when executed by the one or more processors, cause the electronic device to perform a plurality of operations including:

determining at least one sampling point of the virtual object, the sampling point being a point used for performing collision detection relative to a ground;

determining a normal direction of the virtual object relative to the ground at the at least one sampling point and the ground on which the virtual object is located by:

performing collision detection along a vertically downward direction from the sampling point to the ground;

determining a collision point between the virtual object and the ground during collision as a ground-hugging point; and determining the normal direction of the virtual object relative to the ground according to the ground-hugging point;

determining a ground-hugging posture of the virtual object in the virtual environment according to the normal direction; and rendering the virtual object in the virtual environment according to the ground-hugging posture.

13. The electronic device according to claim 12, wherein the sampling point comprises a central point of the virtual object; and the determining the normal direction of the virtual object relative to the ground according to the ground-hugging point comprises:

determining the normal direction of the virtual object relative to the ground according to a first vertical line starting from the ground-hugging point and perpendicular to the ground.

14. The electronic device according to claim 12, wherein the sampling point comprises a front sampling point and a rear sampling point, the front sampling point is a point used for representing an upper half of the virtual object under the ground-hugging posture, and the rear sampling point is a point used for representing a lower half of the virtual object under the ground-hugging posture; and the determining the normal direction of the virtual object relative to the ground according to the ground-hugging point comprises:

determining a connecting line between a first ground-hugging point and a second ground-hugging point, the first ground-hugging point being a point obtained by performing collision detection from the front sampling point, and the second ground-hugging point being a point obtained by performing collision detection from the rear sampling point; and determining the normal direction of the virtual object relative to the ground according to a second vertical line perpendicular to the connecting line and of which a roll angle is 0.

15. The electronic device according to claim 12, wherein the sampling point comprises a front sampling point, a rear sampling point, and a side sampling point, the front sampling point is a point used for representing an upper half of the virtual object under the ground-hugging posture, the rear sampling point is a point used for representing a lower half of the virtual object under the ground-hugging posture, and the side sampling point is a point used for representing a left side or a right side of the virtual object under the ground-hugging posture; and the determining the normal direction of the virtual object relative to the ground according to the ground-hugging point comprises:

determining a plane on which a first ground-hugging point, a second ground-hugging point, and a third ground-hugging point are located, the first ground-hugging point being a point obtained by performing collision detection from the front sampling point, the second ground-hugging point being a point obtained by performing collision detection from the rear sampling point, and the third ground-hugging point being a point obtained by performing collision detection from the side sampling point; and determining the normal direction of the virtual object relative to the ground according to a third vertical line upward perpendicular to the plane.

16. The electronic device according to claim 12, wherein the ground comprises at least one of a region having a gradient, a cambered region, a sunken region, and a protruding region.

17. A non-transitory computer readable storage medium storing computer-readable instructions that, when executed by one or more processors of an electronic device, cause the electronic device to perform operations including:

determining at least one sampling point of the virtual object, the sampling point being a point used for performing collision detection relative to a ground;

determining a normal direction of the virtual object relative to the ground at the at least one sampling point and the ground on which the virtual object is located by:

performing collision detection along a vertically downward direction from the sampling point to the ground;

determining a collision point between the virtual object and the ground during collision as a ground-hugging point; and determining the normal direction of the virtual object relative to the ground according to the ground-hugging point;

determining a ground-hugging posture of the virtual object in the virtual environment according to the normal direction; and rendering the virtual object in the virtual environment according to the ground-hugging posture.

18. The non-transitory computer readable storage medium according to claim 17, wherein the sampling point comprises a central point of the virtual object; and the determining the normal direction of the virtual object relative to the ground according to the ground-hugging point comprises:

determining the normal direction of the virtual object relative to the ground according to a first vertical line starting from the ground-hugging point and perpendicular to the ground.

19. The non-transitory computer readable storage medium according to claim 18, wherein the determining at least one sampling point of the virtual object comprises:

determining the central point of the virtual object as the sampling point of the virtual object.

20. The non-transitory computer readable storage medium according to claim 17, wherein the sampling point comprises a front sampling point and a rear sampling point, the front sampling point is a point used for representing an upper half of the virtual object under the ground-hugging posture, and the rear sampling point is a point used for representing a lower half of the virtual object under the ground-hugging posture; and the determining the normal direction of the virtual object relative to the ground according to the ground-hugging point comprises:

determining a connecting line between a first ground-hugging point and a second ground-hugging point, the first ground-hugging point being a point obtained by performing collision detection from the front sampling point, and the second ground-hugging point being a point obtained by performing collision detection from the rear sampling point; and determining the normal direction of the virtual object relative to the ground according to a second vertical line perpendicular to the connecting line and of which a roll angle is 0.

* * * * *